(12) United States Patent
Høye et al.

(10) Patent No.: US 9,538,098 B2
(45) Date of Patent: Jan. 3, 2017

(54) HYPERSPECTRAL CAMERA AND METHOD FOR ACQUIRING HYPERSPECTRAL DATA

(71) Applicants: Gudrun Kristine Høye, Eidsvoll Verk (NO); Andrei L. Fridman, Eidsvoll Verk (NO)

(72) Inventors: Gudrun Kristine Høye, Eidsvoll Verk (NO); Andrei L. Fridman, Eidsvoll Verk (NO)

(73) Assignee: Norske Elektro Optikk AS, Lorenskog (NO)

( * ) Notice: Subject to any disclaimer, the term of this patent is extended or adjusted under 35 U.S.C. 154(b) by 422 days.

(21) Appl. No.: 14/140,598

(22) Filed: Dec. 26, 2013

(65) Prior Publication Data

US 2014/0293062 A1    Oct. 2, 2014

Related U.S. Application Data

(63) Continuation of application No. PCT/NO2012/050132, filed on Jul. 5, 2012.

(30) Foreign Application Priority Data

Jul. 8, 2011  (NO) .................................. 20111001

(51) Int. Cl.
H04N 5/30   (2006.01)
G01J 3/02   (2006.01)
G01J 3/28   (2006.01)

(52) U.S. Cl.
CPC .............. *H04N 5/30* (2013.01); *G01J 3/0216* (2013.01); *G01J 3/0229* (2013.01); *G01J 3/2803* (2013.01); *G01J 3/2823* (2013.01)

(58) Field of Classification Search
CPC ................... H01L 2924/0002; H01L 2924/00; H01L 33/502; C09K 11/584; C09K 11/595; C09K 11/623; C09K 11/642; C09K 11/643; C09K 11/644; C09K 11/662; C09K 11/666; C09K 11/672; C09K 11/7701; C09K 11/7708; C09K 11/7718; C09K 11/7729; C09K 11/7731; C09K 11/7734; C09K 11/7769; C09K 11/7771; C09K 11/7774; C09K 11/7776; C09K 11/7784; C09K 11/7786; C09K 11/7787; C09K 11/7789; C09K 11/7797; G21K 2004/06; G21K 4/00; H01J 2211/42; H01J 29/085; H01J 29/20; H05B 33/14; H05B 33/20; G01J 3/0216; G01J 3/0229; G01J 3/2803; G01J 3/2823; H04N 5/30
(Continued)

(56) References Cited

U.S. PATENT DOCUMENTS 4,176,923 A * 12/1979 Collender .............. G03B 35/00
                                                         348/E13.008
5,278,687 A *  1/1994 Jannson .................. H04J 14/02
                                                         398/79
(Continued)

OTHER PUBLICATIONS

Mouroulis, P., Spatial and spectral uniformity in pushbroom spectrometers, Jet Propulsion Laboratory, SIPE conference on imaging V, Denver, CO, 1999.
(Continued)

*Primary Examiner* — Shan Elahi
(74) *Attorney, Agent, or Firm* — Richard A. Fagin

(57) ABSTRACT

A hyperspectral camera includes light mixing chambers projected onto an imaging sensor. The projection of each chamber is slightly larger than a sensor pixel. The chambers are placed as a linear array in a slit plane or as a two dimensional matrix in front of the imaging sensor. The mixed light from each chamber is depicted by several sensor pixels. The sensor outputs information used to form an
(Continued)

overdetermined equation set. The set is solved and optimized for the solution giving the lowest overall error or the best fit. The solution of the equation set combined with the optimization is the intensity values of the chambers constituting imaginary pixels being calculated. These imaginary pixels form the output of an improved hyperspectral camera system, which has significantly lower optical errors like keystone and point spread function variation for different wavelengths.

20 Claims, 19 Drawing Sheets

(58) Field of Classification Search
USPC .......................................................... 348/162
See application file for complete search history.

(56) References Cited

U.S. PATENT DOCUMENTS

| | | | | |
|---|---|---|---|---|
| 6,134,003 | A * | 10/2000 | Tearney | A61B 1/00096 356/479 |
| 6,501,551 | B1 * | 12/2002 | Tearney | A61B 1/00096 356/477 |
| 7,773,218 | B2 | 8/2010 | Brady et al. | |
| 9,066,736 | B2 * | 6/2015 | Islam | A61B 18/20 |
| 2002/0067467 | A1 * | 6/2002 | Dorval | G02B 27/2285 353/10 |
| 2002/0163482 | A1 * | 11/2002 | Sullivan | 345/6 |
| 2004/0109164 | A1 * | 6/2004 | Horii | G01B 9/0201 356/479 |
| 2004/0129889 | A1 * | 7/2004 | Barron | C08K 3/0008 250/370.08 |
| 2004/0232339 | A1 * | 11/2004 | Lanoue | G01N 21/255 250/339.05 |
| 2004/0239880 | A1 * | 12/2004 | Kapellner et al. | 353/20 |
| 2005/0041113 | A1 * | 2/2005 | Nayar | G02B 5/205 348/219.1 |
| 2006/0018025 | A1 * | 1/2006 | Sharon et al. | 359/618 |
| 2006/0072109 | A1 | 4/2006 | Bodkin et al. | |
| 2007/0047043 | A1 * | 3/2007 | Kapellner | G02B 27/0944 359/30 |
| 2008/0024768 | A1 * | 1/2008 | Babayoff | 356/73 |
| 2008/0123097 | A1 * | 5/2008 | Muhammed | G01J 3/02 356/419 |
| 2009/0136154 | A1 * | 5/2009 | Bocko | G06F 17/147 382/280 |
| 2009/0201498 | A1 * | 8/2009 | Raskar | G01J 3/02 356/310 |
| 2010/0201823 | A1 * | 8/2010 | Zhang et al. | 348/164 |
| 2011/0206291 | A1 * | 8/2011 | Kashani | A61B 3/12 382/255 |
| 2012/0106170 | A1 * | 5/2012 | Matthews | F41G 1/30 362/311.06 |

OTHER PUBLICATIONS

Arai, K. et al., Unmixing method for hyperspectral data based on sub-spacevmethod with learning process, Advances in Space Research 44 (2009) 517-523.

Wagadarikar, A. et al., Single disperser design for coded aperture snapshot spectral imaging, Applied Optics vol. 47, No. 10 Apr. 1, 2008 (Optical Society of America).

* cited by examiner

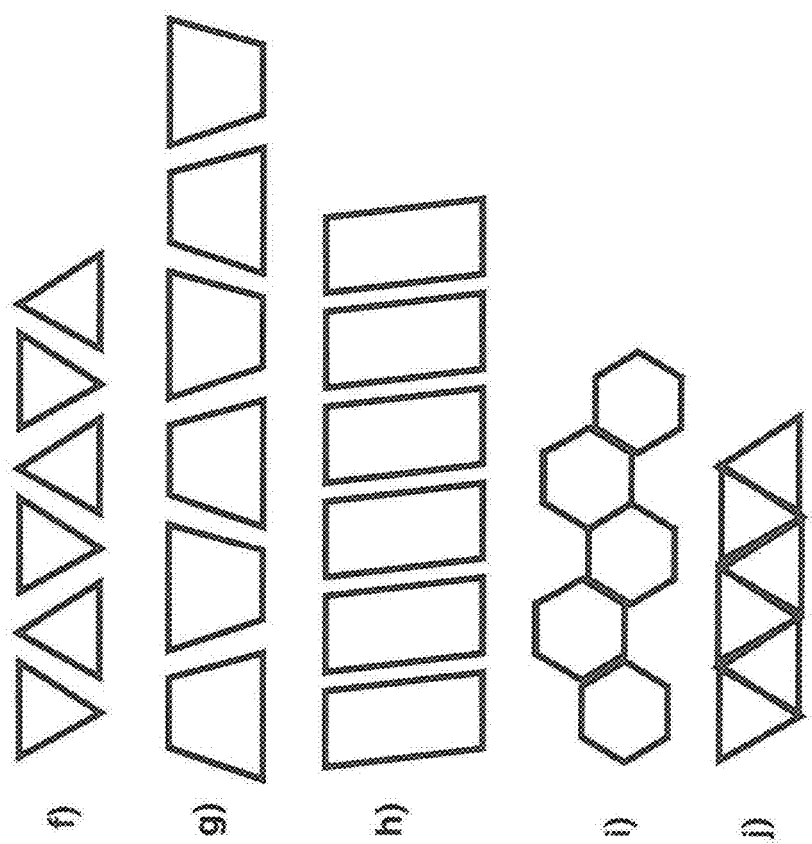
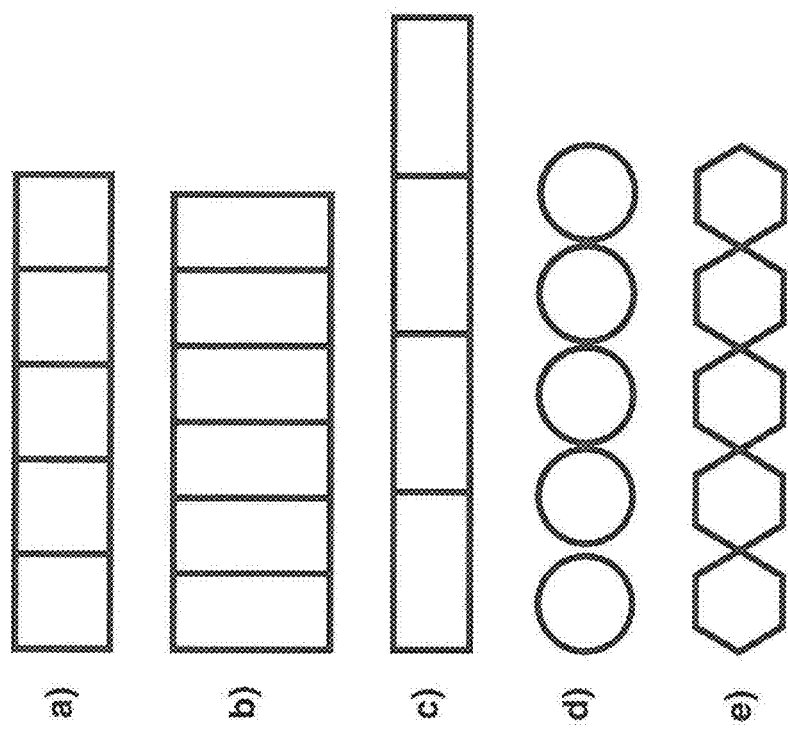
Figure 6

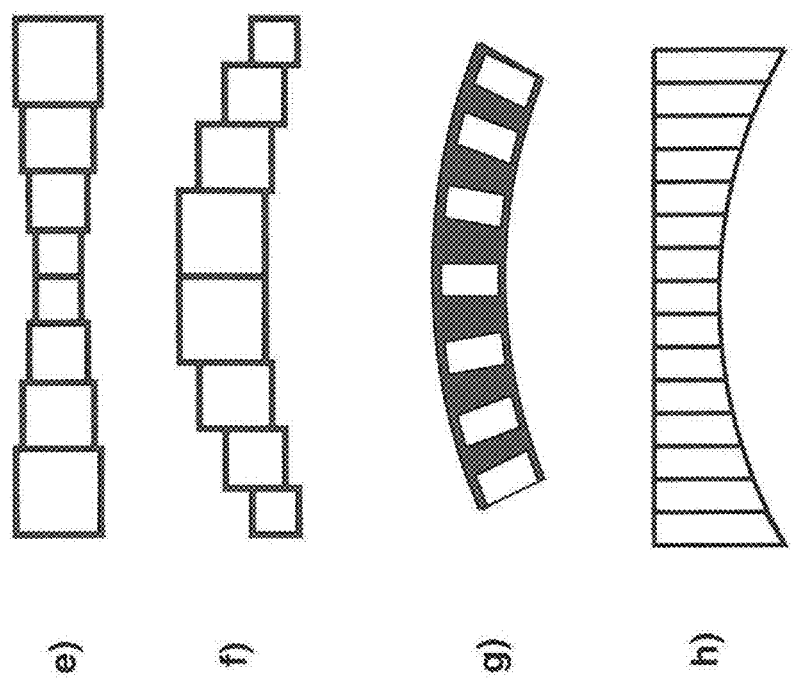
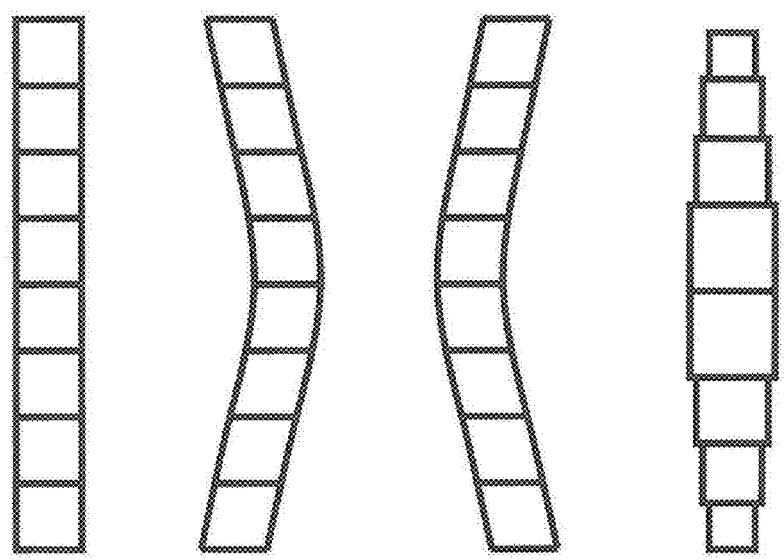
Figure 7

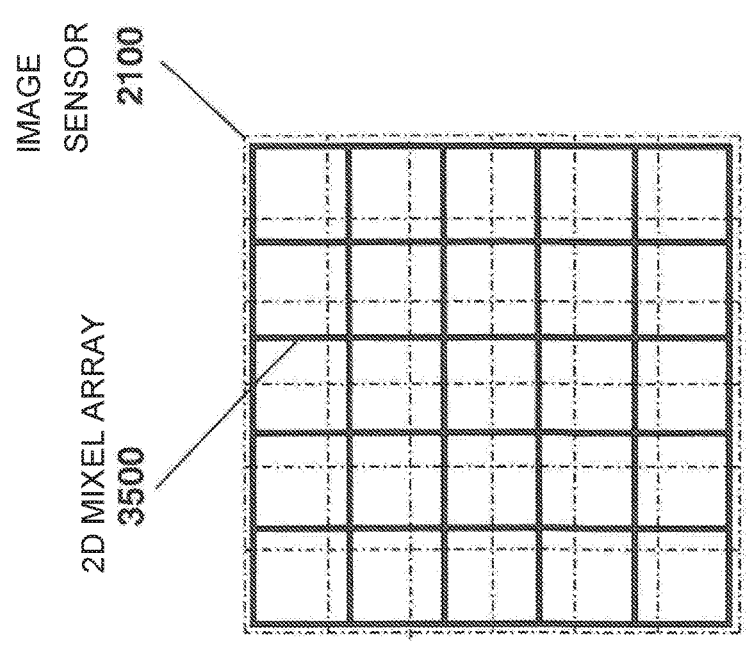
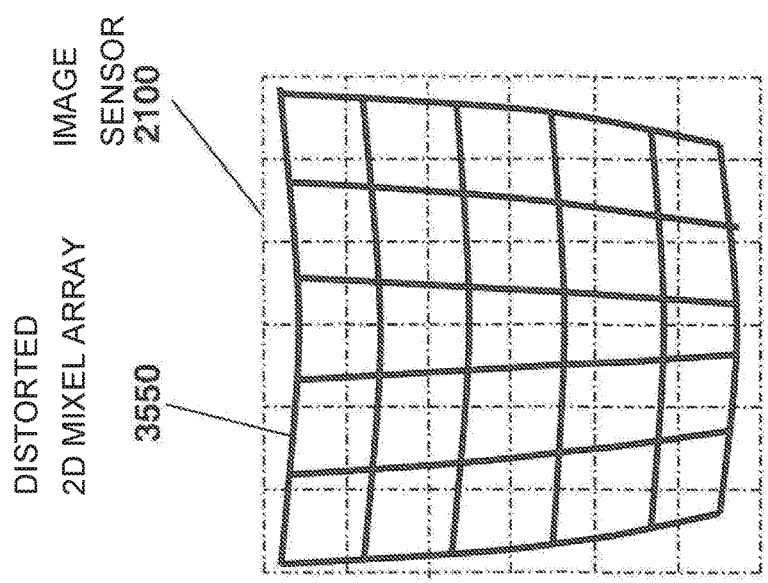

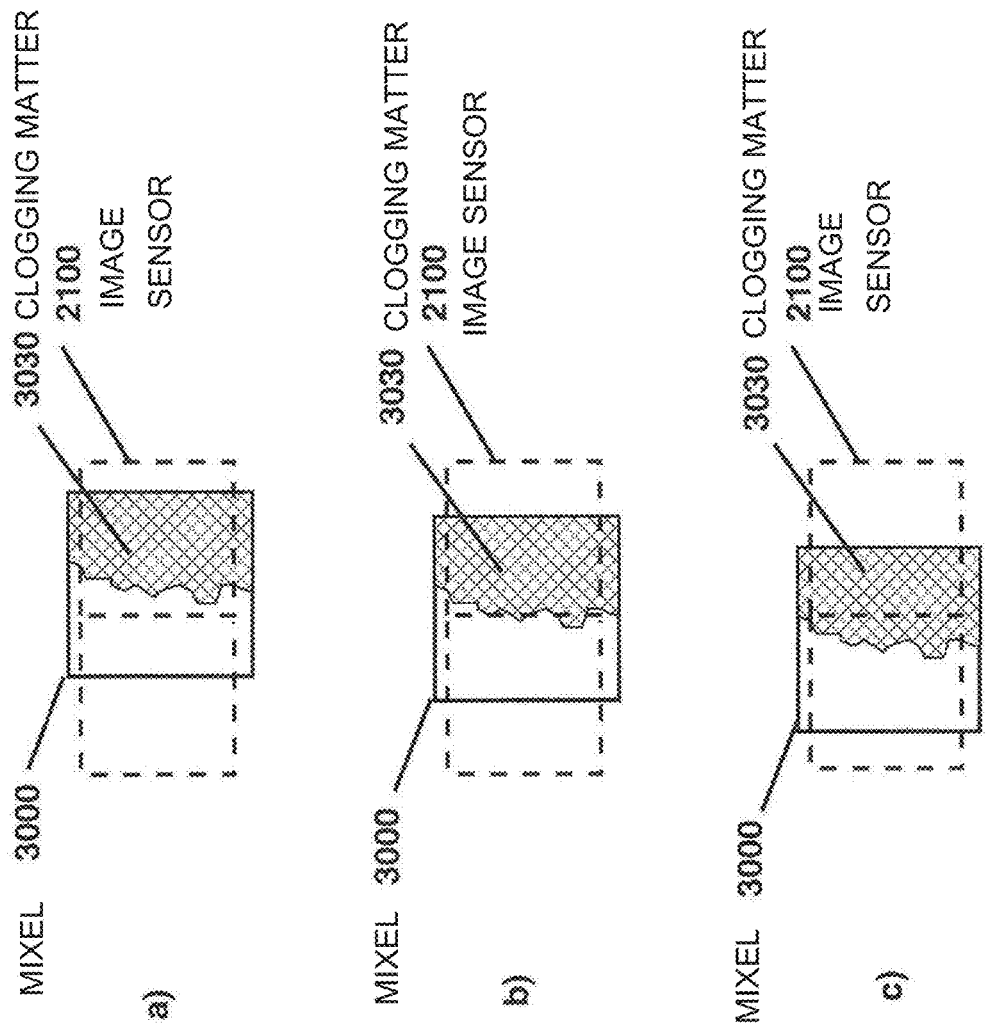

HYPERSPECTRAL CAMERA AND METHOD FOR ACQUIRING HYPERSPECTRAL DATA

CROSS-REFERENCE TO RELATED APPLICATIONS

Continuation of International Application No. PCT/NO2012/050132 filed on Jul. 5, 2012. Priority is claimed from Norwegian Patent Application No. 20111001 filed on Jul. 8, 2011.

STATEMENT REGARDING FEDERALLY SPONSORED RESEARCH OR DEVELOPMENT

Not applicable.

BACKGROUND

There has been a growth in the use of hyperspectral cameras for aerial imaging, environmental monitoring, forensic science, forestry, agriculture as well as in military and industrial applications. Hyperspectral cameras normally also cover a wavelength range outside the visible thus making the design of the optical system very challenging. There are different principles of hyperspectral imagers, but in this patent application a "hyperspectral camera" is defined as a hyperspectral imager of the "push broom" type.

One of the most important limiting factors in a hyperspectral imaging system is spatial misregistration as function of wavelength. In hyperspectral data, each spatial pixel is supposed to contain the signals for different spectral bands captured from the same spatial area. This type of misregistration occurs when either the position of a depicted area (corresponding to one pixel) changes as function of wavelength (this error is commonly referred to as "keystone"), or the borders or objects in the depicted area are blurred differently for different spectral channels, which is caused by variation in the point spread function (PSF) as function of wavelength. In practice this means that information from different positions on the scene depicted can be intermixed and resulting in an erroneous spectrum for spatial image pixels positioned close together.

Another effect or limiting factor is a similar spectral misregistration commonly referred to as "smile". This effect will partly shift the spectrum of a depicted point.

Most push-broom spectrometers operate as follows: they project a one-dimensional image of a very narrow scene area onto a two-dimensional pixel array. A dispersing element (a diffraction grating or a prism) disperses light in such a way that, instead of a one-dimensional image elongated in X direction, each column of the array contains spectrum of one small scene area as shown in FIG. 2. The two-dimensional image of the scene is then obtained by scanning. The final data form a so-called "datacube", which represents a two-dimensional image with the third dimension containing the spectral information for each spatial pixel.

Due to various optical aberrations in real-world hyperspectral cameras, the spectral information is not captured perfectly. Spectral misregistration occurs when a given pixel on the sensor is expected to receive light from a certain spectral band but instead receives slightly wrong wavelengths. Spatial misregistration occurs when a pixel on the sensor receives a certain spectral band but looks at slightly wrong area of the scene. Misregistration is discussed in more detail in the article "Spectral and spatial uniformity in pushbroom imaging spectrometers" by Pantazis Mouroulis, 1999.

Both types of misregistration may severely distort the spectral information captured by the camera. Therefore they should be corrected to a small fraction of a pixel. In hyperspectral cameras for the visible and near-infrared region (VNIR) spectral misregistration can be corrected by oversampling the spectral data and resampling it in post-processing (since most of the sensors have many extra pixels in the spectral direction, such a camera will still have good spectral resolution). However, it is normally desirable to correct the spatial misregistration in hardware as well as possible.

Spatial misregistration in hyperspectral cameras is caused by two factors:

1). Variation in position of the PSF's centre of gravity as a function of wavelength, usually called spectral keystone. This is shown in FIG. 4.

2). Variation in size and shape of PSF as a function of the wavelength. This is shown in FIG. 5.

Since the positions of PSF's centre of gravity for different wavelengths must not differ by more than a small fraction of pixel size (even as small deviation as 0.1 of a pixel may introduce noticeable errors in the measured spectrum), optical design of such systems is very challenging. Keeping the size and the shape of PSF similar for all wavelengths is perhaps even more difficult.

In general, pixel count in hyperspectral cameras is very modest (compared to traditional imaging systems such as photocameras), since it is not enough just to produce a reasonably sharp image, and optical aberrations have to be corrected at subpixel level. Optical design becomes extremely difficult if higher spatial resolution is required.

Another serious challenge is to build the designed camera. Manufacturing and centration tolerances for hardware corrected cameras (even with relatively modest spatial resolution of 300-600 pixels) can be very tight.

As a result of such strict requirements to the image quality, the new hyperspectral cameras more or less converged to a few designs which offer somewhat acceptable correction of spatial misregistration.

Offner relay with a convex diffraction grating has magnification −1 and is often used in hyperspectral cameras ("Optical design of a compact imaging spectrometer for planetary mineralogy" by Pantazis Mouroulis et al, Optical Engineering 466, 063001 June 2007; U.S. Pat. No. 5,880, 834). It can be designed to have reasonably small spectral keystone. Variations in PSF's size and shape can be corrected to some extent, but there are too few optical surfaces to make this kind of correction perfect. In a real system manufacturing and centration tolerances degrade the spatial misregistration further. Even though Offner relay is not very sensitive to decentration, the tolerances can be very tight in cameras with high spatial resolution. The minimum i.e., the fastest F-number in Offner cameras is limited to approx. F2.5. Polarisation dependency of the diffraction grating may be a problem.

Dyson relay is another example of an optical system used in hyperspectral imaging. (*Optical design of a coastal ocean imaging spectrometer*, by Pantazis Mouroulis et al, 9 Jun. 2008/Vol. 16, No. 12/OPTICS EXPRESS 9096). It has magnification −1 and uses a concave reflective grating as a dispersive element. There is also at least one refractive element. The F-number can be significantly lower (faster) than in Offner systems. The system can be quite small. However, extremely tight centration requirements make it difficult to achieve low misregistration errors even with low resolution sensors. Both the slit and the detector face the same optical surface, therefore stray light is often a problem.

Also, it is a challenge even to place the detector close enough to the first optical surface (as close as it is required in the Dyson design). Due to extremely tight tolerances and practical difficulties in placing the detector, the resolution of Dyson cameras is not particularly high.

Design and manufacturing of good foreoptics (i.e. the foreoptics which would take full advantage of low misregistration error in the following relay) for both Offner and especially Dyson relays is very challenging.

Some manufacturers base their hyperspectral cameras on various proprietary lens systems. Performance of such cameras is more or less similar to the performance of the Offner based cameras.

In a push-broom hyperspectral camera rays with different wavelengths are focused on different parts of the sensor. Therefore, compared to more traditional imaging systems (such as photolenses), sensor tilt can be introduced (U.S. Pat. No. 6,552,788 B1). This tilt can be used as an additional parameter when correcting keystone, smile, and PSF variations in the optical system. Of course, the tilt will not eliminate keystone etc. completely—it merely offers more flexibility in optimizing system's performance. However, in relatively complex systems, where there are many such parameters available already, introduction of this additional parameter may not lead to any significant improvements in keystone, smile, and PSF variation correction.

A known alternative to precise correction of spatial misregistration in hardware is resampling. Since the most challenging requirements are lifted in resampling cameras, the optical design becomes similar to traditional imaging optics. This gives a possibility to design optics with lower (faster) F-number, high resolution etc. The negative side is the fact that the residual spatial misregistration after resampling with approx. 1× factor is quite large. In order to bring it down to acceptable level downsampling by factor 2× or more is usually required. Therefore the full sensor resolution is not utilized. Also, the necessity to capture two times more pixels than in case of hardware corrected systems, may slow down the frame rate and processing speed.

Variable filter camera is another way to capture hyperspectral data. The principle of operation is described in the U.S. Pat. No. 5,790,188. This camera can be quite small compared to the other hyperspectral cameras. However, it may be necessary to resample the captured data, unless the scanning motion is stable with subpixel accuracy. Also, the spectral resolution becomes very limited if a reasonably low F-number is required.

If a hyperspectral camera has to work in a very wide spectral range, it may be beneficial to split this range between two or more sensors, as described in the NASA PIDDP Final Report (May 1, 1996), *A Visible-Infrared Imaging Spectrometer for Planetary Missions*. Example of such an imaging spectrometer is shown on FIG. 3 of this report. Since both sensors share foreoptics and slit, it is possible to get very good spatial coregistration in the along-the-track direction. However, in the across-the-track direction (where keystone is normally measured) it will be nearly impossible to achieve good (i.e. a few percent of a pixel) coregistration. This drawback of the multiple sensor approach is explained in the Final Report of the *Concept for Future Visible and Infrared Imager>>Study*, by Astrium GmbH for ESA, Doc. No FI-RP-ASG-0007 (Chapter 4.5.3, Page 4-33).

If the slit 2040 in the camera from FIG. 2 is replaced by a thin plate with pinholes arranged in a two-dimensional array, it becomes possible to capture the data cube in one exposure without scanning. This approach together with possible enhancements is thoroughly described in the US Patent Application Publication Nos. 2006/0072109 A1 and 2008/0088840 A1. While being great for some applications (such as multispectral video), this approach severely limits spatial and/or spectral resolution of cameras (if compared with push-broom approach). Also, cameras built on this principle are just as prone to smile and keystone errors as the previously described push-broom cameras.

Necessity to correct spectral keystone to a very small fraction of a pixel is the principal driver restricting the spatial resolution of the existing hyperspectral cameras, possible design approaches, speed (i.e. light gathering ability), and the final data quality. Resampling hyperspectral cameras, while being free of the first three restricting factors, normally require downsampling of the captured data by a large factor, which reduces the resolution (i.e. pixel count) of the final data. In other words, even though it is possible to design and manufacture a resampling camera with very sharp optics and very high pixel count, the captured data have to be downsampled by a relatively large factor in order to match the data quality from a hardware corrected camera. This downsampled data may still have higher pixel count than the data from a hardware corrected camera, but clearly the full resolution of the sensor will not be utilized.

To sum up this means that in state-of-the-art systems the requirement for keystone correction in the optics typically limit the maximum resolution, the light collecting capabilities of the system, not to mention the number of feasible optical design solutions.

Even when the keystone has been corrected as well as possible using all available techniques, the remaining keystone will still be significant for a vast majority of systems. In the few systems where the keystone appears to be closer to acceptable the overall resolution or pixel count is relatively low. The cause of this is that the precision of the keystone correction is linked to the pixel count for current state-of-the-art systems. Physically in any given system keystone is a certain fraction of the image size. When one increases the pixel count for a given image size, keystone as a fraction of the pixel size will therefore increase.

BRIEF DESCRIPTION OF THE DRAWINGS

FIGS. 6A through 6J shows various possible shapes of mixels.

FIG. 7A shows that the mixel array can be straight. FIGS. 7B and 7C show the mixel can be curved in order to compensate optical aberrations. FIGS. 7D and 7E show the mixels can have different size. FIG. 7F shows these two approaches can be combined. FIG. 7G shows a curved mixel array, while FIG. 7H shows a mixel array with varying mixel chamber lengths.

FIG. 15A shows a two-dimensional mixel array (3500) on top of a two-dimensional pixel array or sensor (2100). FIG. 15B shows the same layout but this time the mixel array is distorted (3500) to fit the smile and keystone generated by the camera optics. The restored mixel intensities will represent smile-free and keystone-free hyperspectral data.

FIGS. 19A through 19C show some examples of a partially clogged light mixing element.

DETAILED DESCRIPTION

Figure 1:
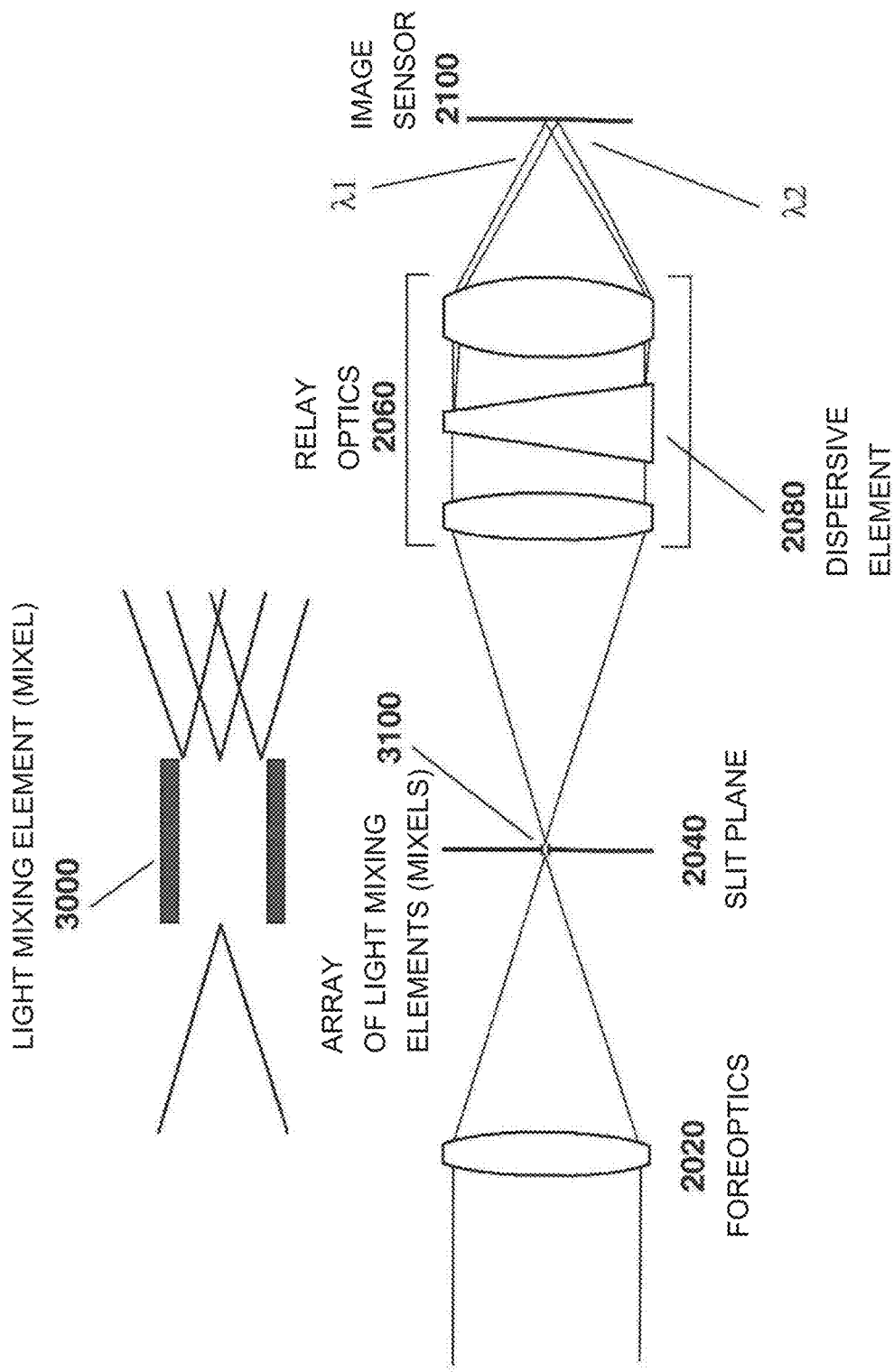
FIG. 1 shows the basic principle of the current disclosure

FIG. 1 shows the basic principle of the current disclosure. Foreoptics (2020) project the scene onto a slit plane (2040). The slit plane (2040) contains an array of light mixing elements (3100). Each element (called a "mixel") (3000) represents one spatial pixel in the final hyperspectral data.

Relay optics (2060) projects the image of the slit (3100) onto the sensor (2100). The image of each mixel (3000) is slightly (a few percent) larger than one sensor pixel. Also, to reduce noise in the final data it is beneficial to make the projection of the mixel array at least 1 pixel shorter than the length of the sensor, so that for every mixel (including the mixels at the ends of the mixel array) most of the energy is captured by the sensor. The dispersive element (2080) in the relay optics (2060) ensures that the image of the slit is dispersed approximately perpendicular to the slit. Different wavelengths λ1 and λ2 are dispersed differently.

Figure 2:
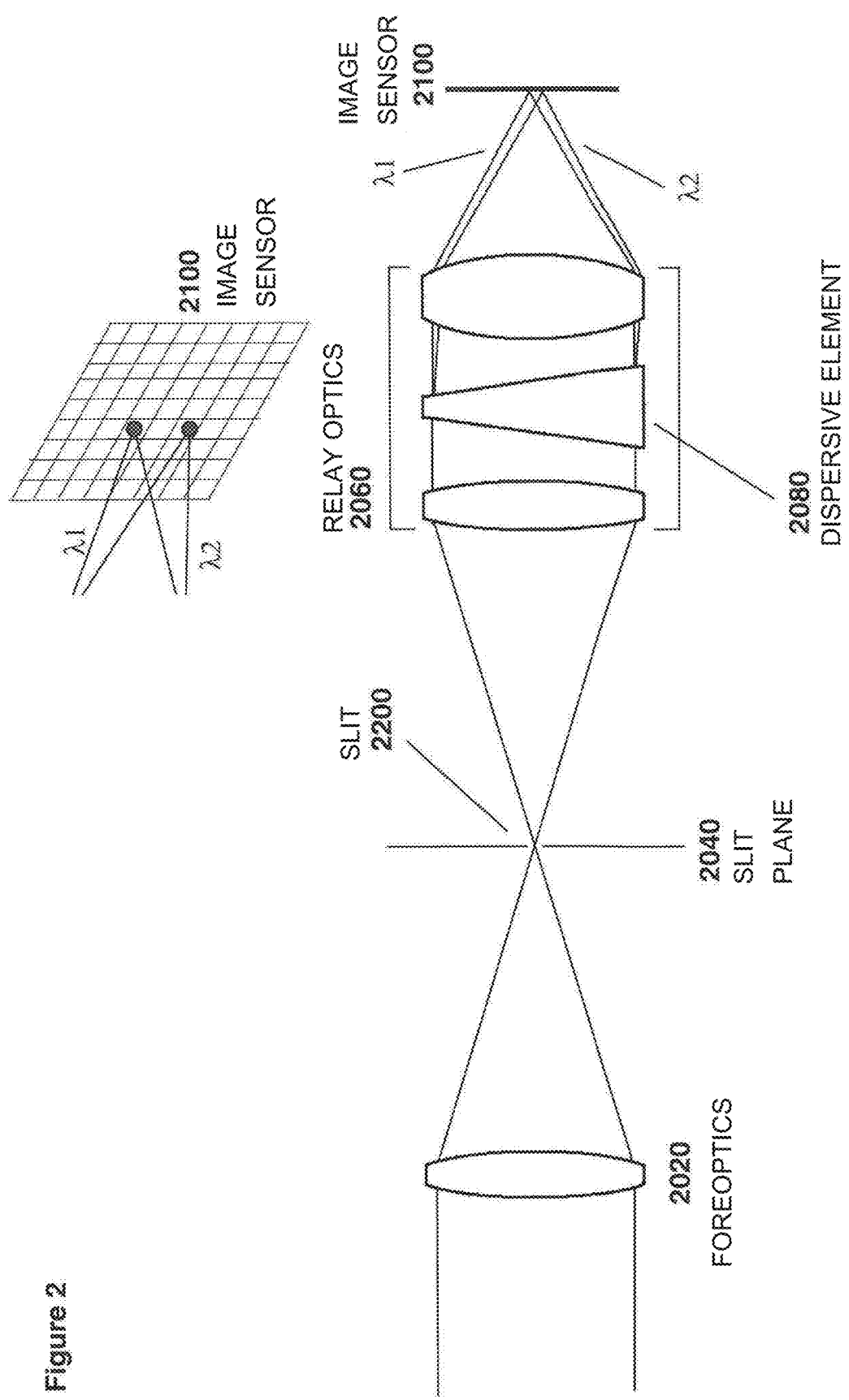
FIG. 2 shows a prior art hyperspectral camera.

FIG. 2 shows the known art. It illustrates the general principle of a push-broom hyperspectral camera. The foreoptics (2020) create an image of the scene in the slit plane (2040). The slit (2200) acts as a field stop and cuts out a narrow portion of the image and transmits it further into the relay system (2060). The relay system (2060) images this narrow scene region onto the sensor (2100). Due to the dispersive element (2080) in the relay, the image of the slit is dispersed on the sensor—so that the different wavelengths (λ1, λ2) are imaged onto different parts of the sensor.

FIGS. 3A through 3F show a slit (3100) with mixing chambers and the additional holes/chambers for calibration purposes. Various configurations are shown.

A single array of mixels (3100) is shown in FIG. 3A.

A single array of mixels with an additional mixel at one end of the slit (3150) is shown in FIG. 3B. This single mixel makes it possible to measure the relative position of the mixel array and the sensor or their relative length.

A single array of mixels with two additional mixels—one on each end of the mixel array (3150, 3170) is shown in FIG. 3C. These single mixels make it possible to measure the relative position of the mixel array and the sensor as well as their relative length.

The array of mixels (3100) shown in FIG. 3D, like that shown in FIG. 3A, and a secondary array of mixels (3200) with relatively large gaps between the mixels. The secondary array allows to measure PSF and keystone of the optics before taking the measurements.

The mixels in the array (3100) shown in FIG. 3E are not necessarily squared.

The additional mixels (3190) shown in FIG. 3F at the ends of the slit are not necessarily squared.

Figure 4:
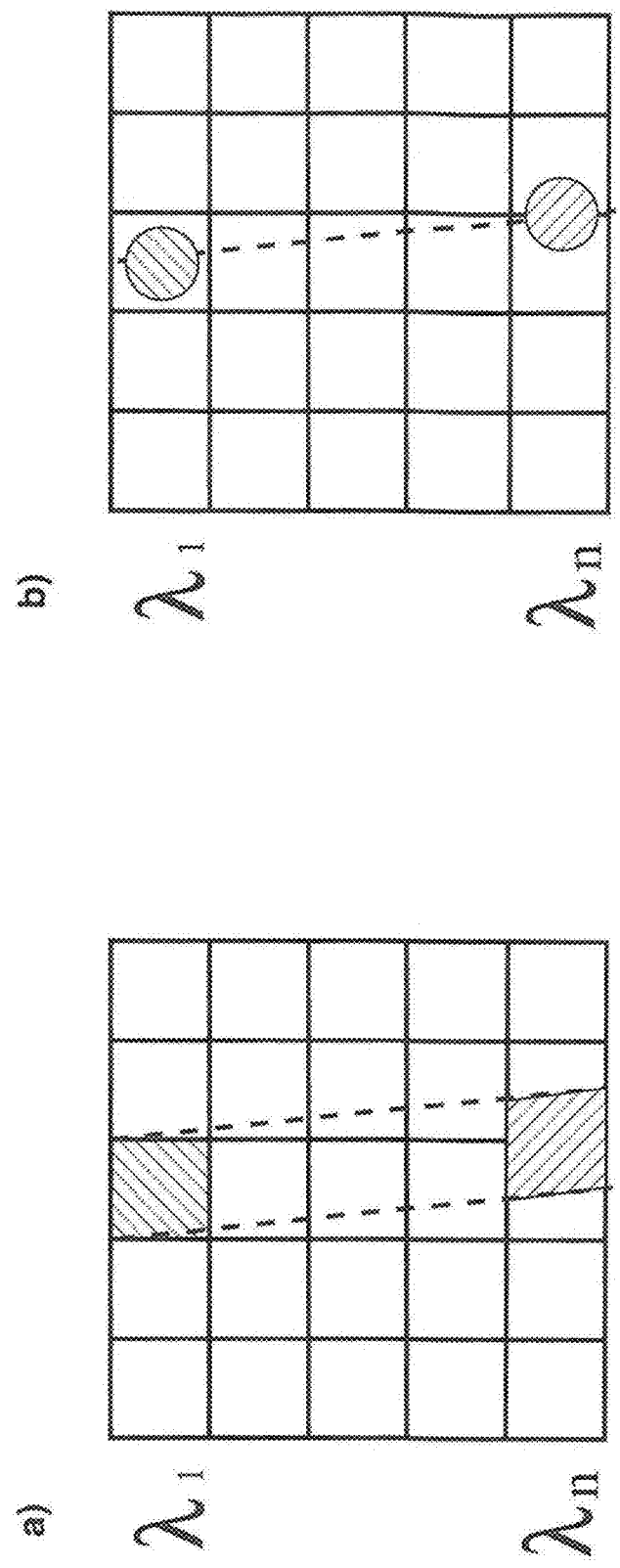
FIGS. 4A and 4B illustrate what a spectral keystone is.

FIG. 4A and FIG. 4B illustrate what a spectral keystone is. The centers of gravity of the PSF for different wavelengths are not located on the same vertical line, and the light coming from the same area of the scene is recorded as coming from slightly different areas depending on the wavelength.

Figure 5:
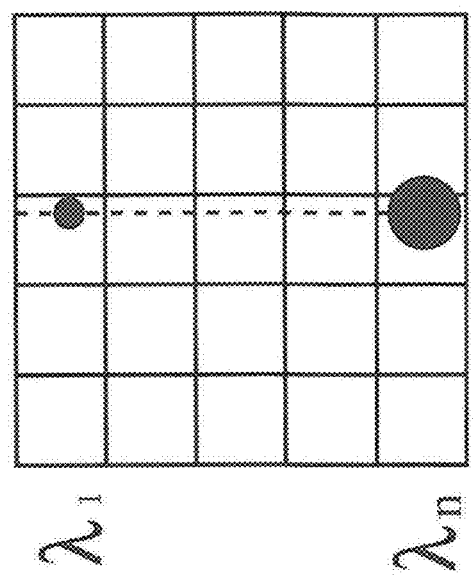
FIG. 5 shows that a keystone-like effect may occur in the final data even if the actual keystone of the optical system is zero. This phenomenon is caused by variation of PSF for different wavelength.

FIG. 5 shows that a keystone-like effect may occur in the final data even if the actual keystone of the optical system is zero. This phenomenon is caused by variation of PSF for different wavelength.

FIGS. 6A through 6J shows various possible shapes of mixels.

FIG. 7A shows that the mixel array can be straight. FIGS. 7B and 7C show the mixel array can be curved in order to compensate optical aberrations. Also, the mixels can have different size as shown in FIGS. 7D and 7E. FIG. 7F shows these two approaches can be combined. FIG. 7G shows a curved mixel array, while FIG. 7H shows a mixel array with varying mixel chamber lengths.

Figure 8:
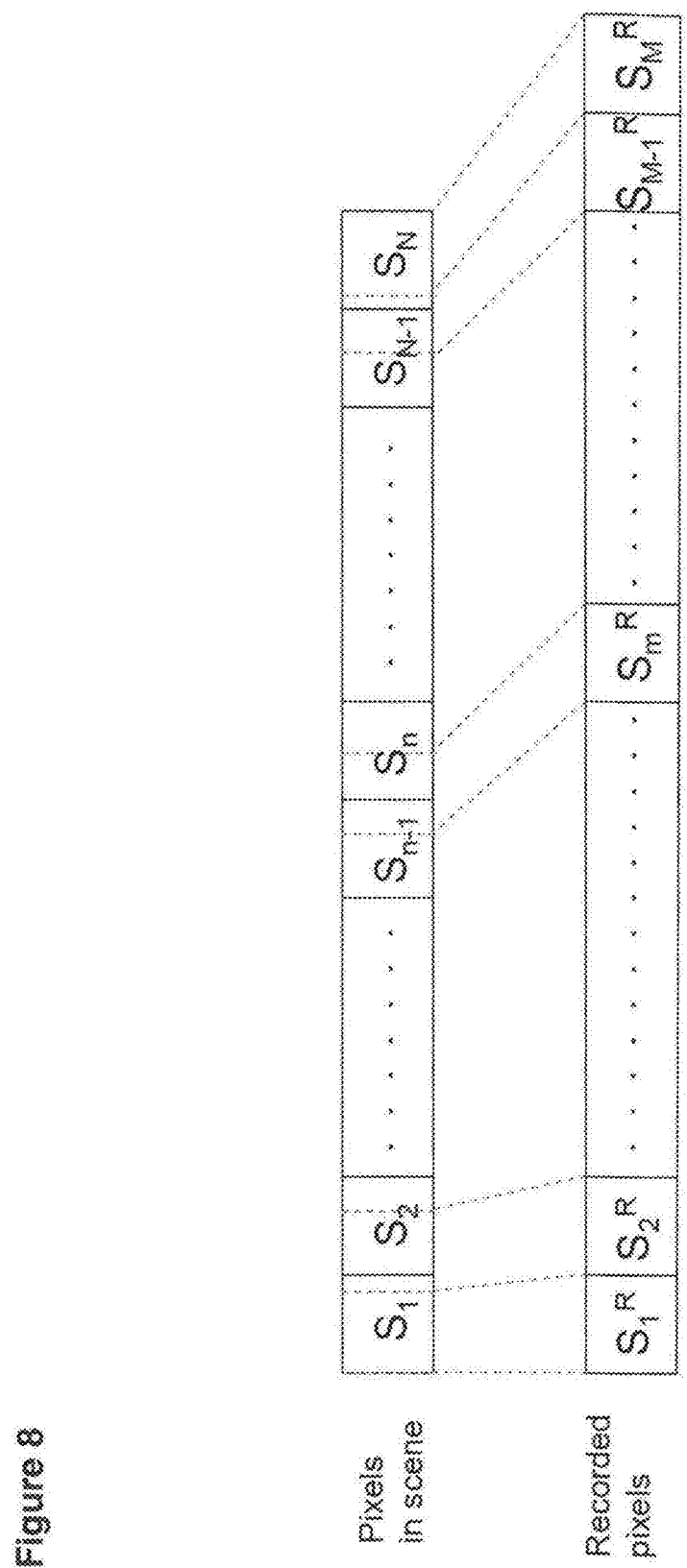
FIG. 8 shows the general example of how mixels are recorded on the sensor in the case of perfectly sharp optics.

FIG. 8 shows the general example of how mixels are recorded on the sensor in the case of perfectly sharp optics.

Figure 9:
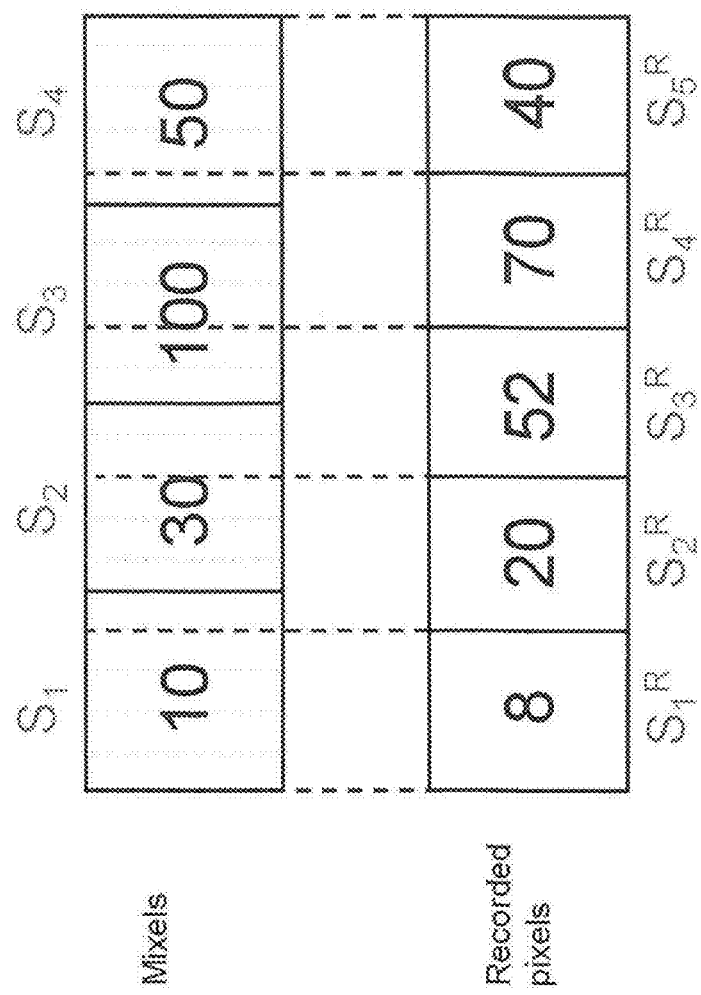
FIG. 9 shows a simple numerical example of how mixels are recorded on the sensor in the case of perfectly sharp optics.

FIG. 9 shows a simple numerical example of how mixels are recorded on the sensor in the case of perfectly sharp optics.

Figure 10:
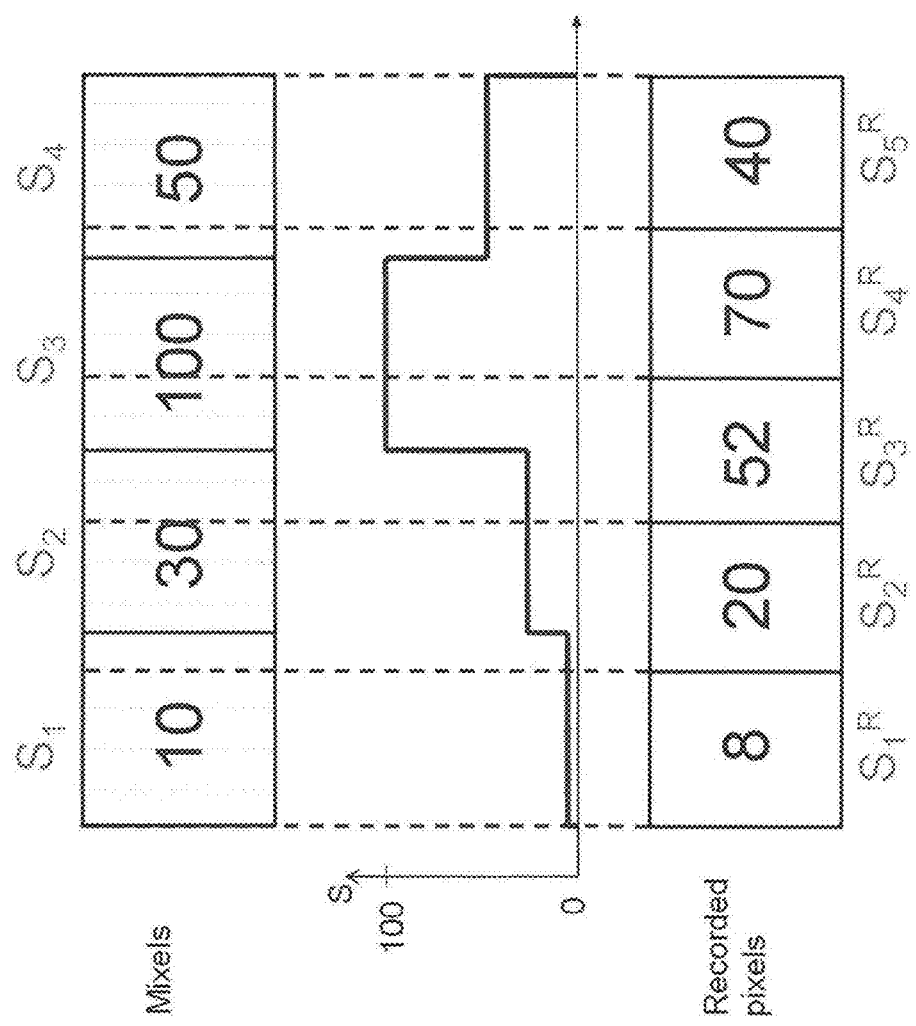
FIG. 10 illustrates that the mixel content can be perfectly restored from the recorded pixels.

FIG. 10 illustrates that the mixel content can be perfectly restored from the recorded pixels.

Figure 11:
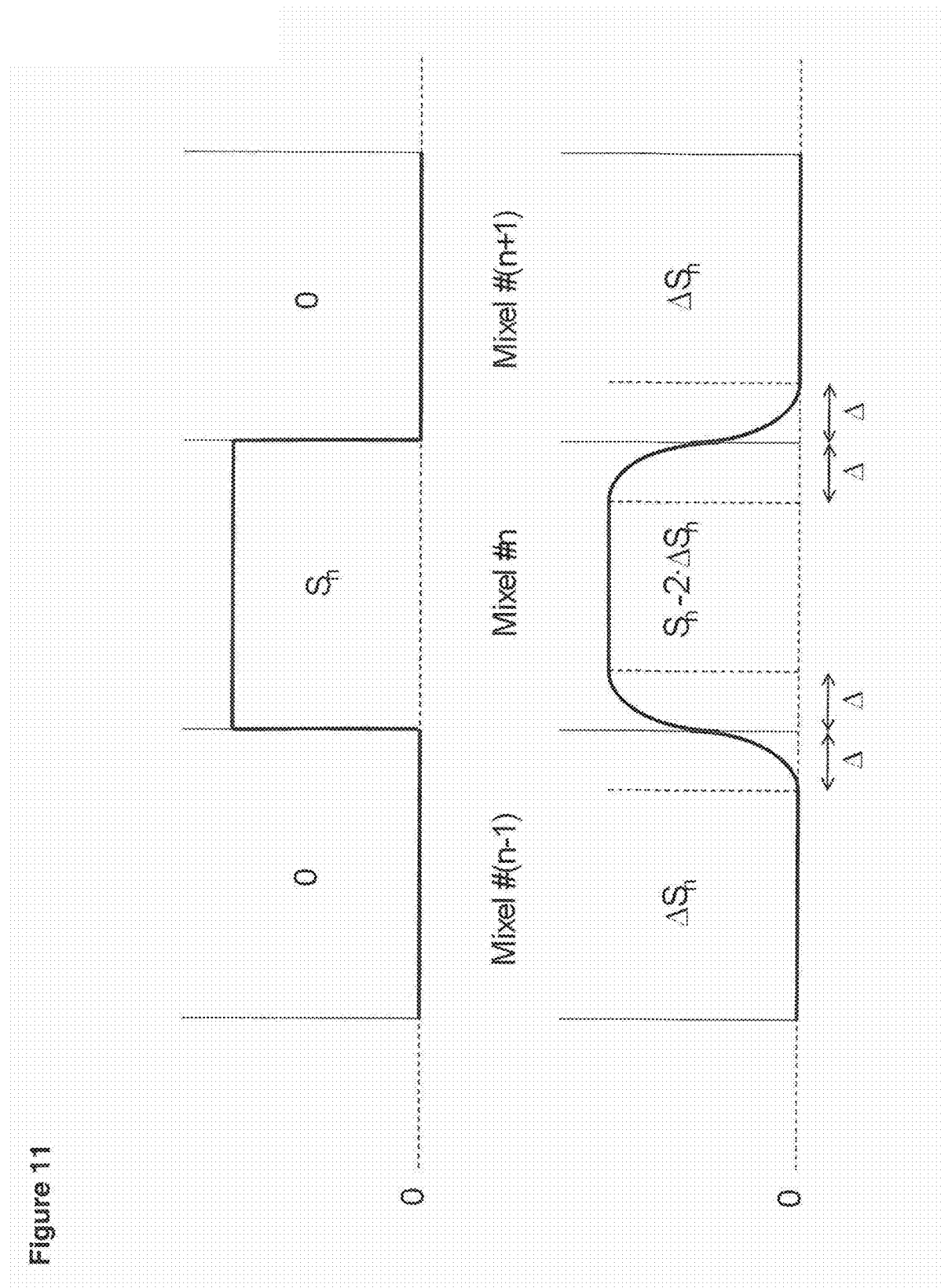
FIG. 11 shows how an image of a mixel may look if the relay optics is not perfectly sharp.

FIG. 11 shows how an image of a mixel may look if the relay optics is not perfectly sharp.

Figure 12:
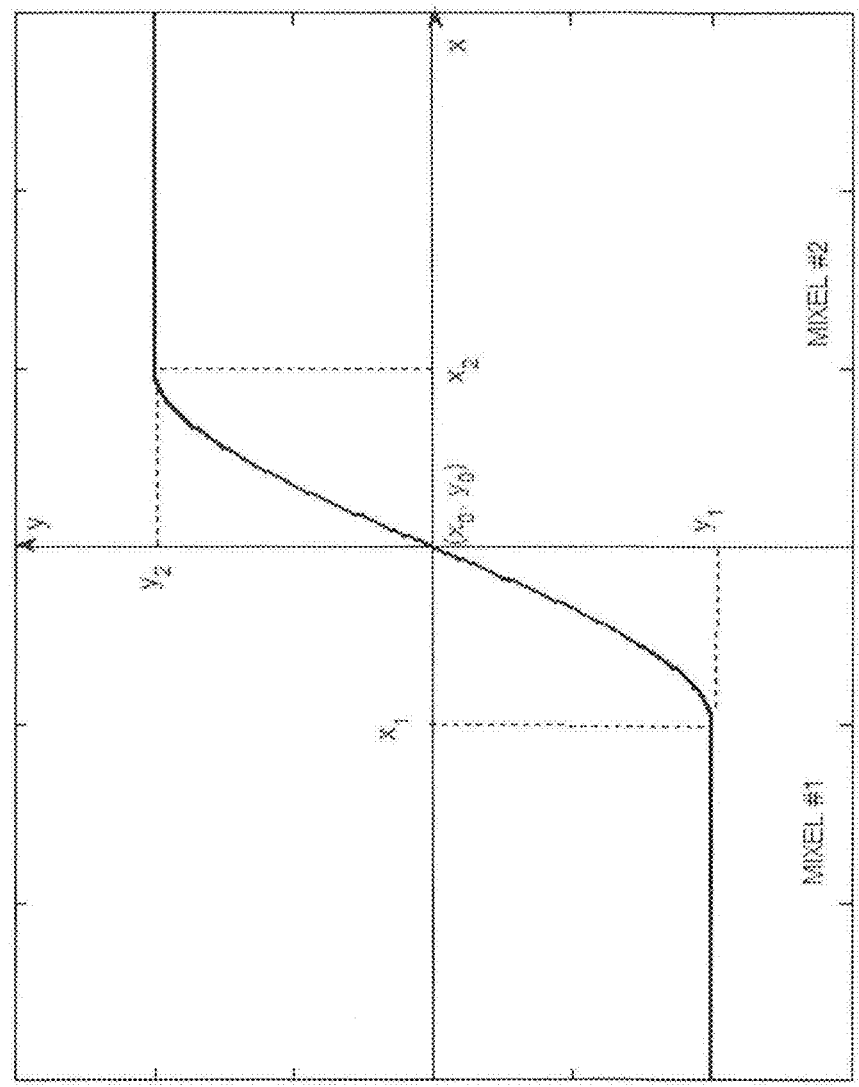
FIG. 12 shows a possible representation of a transition between two mixels after they have been imaged onto the sensor by the relay optics.

FIG. 12 shows a possible representation of a transition between two mixels after they have been imaged onto the sensor by the relay optics.

Figure 13:
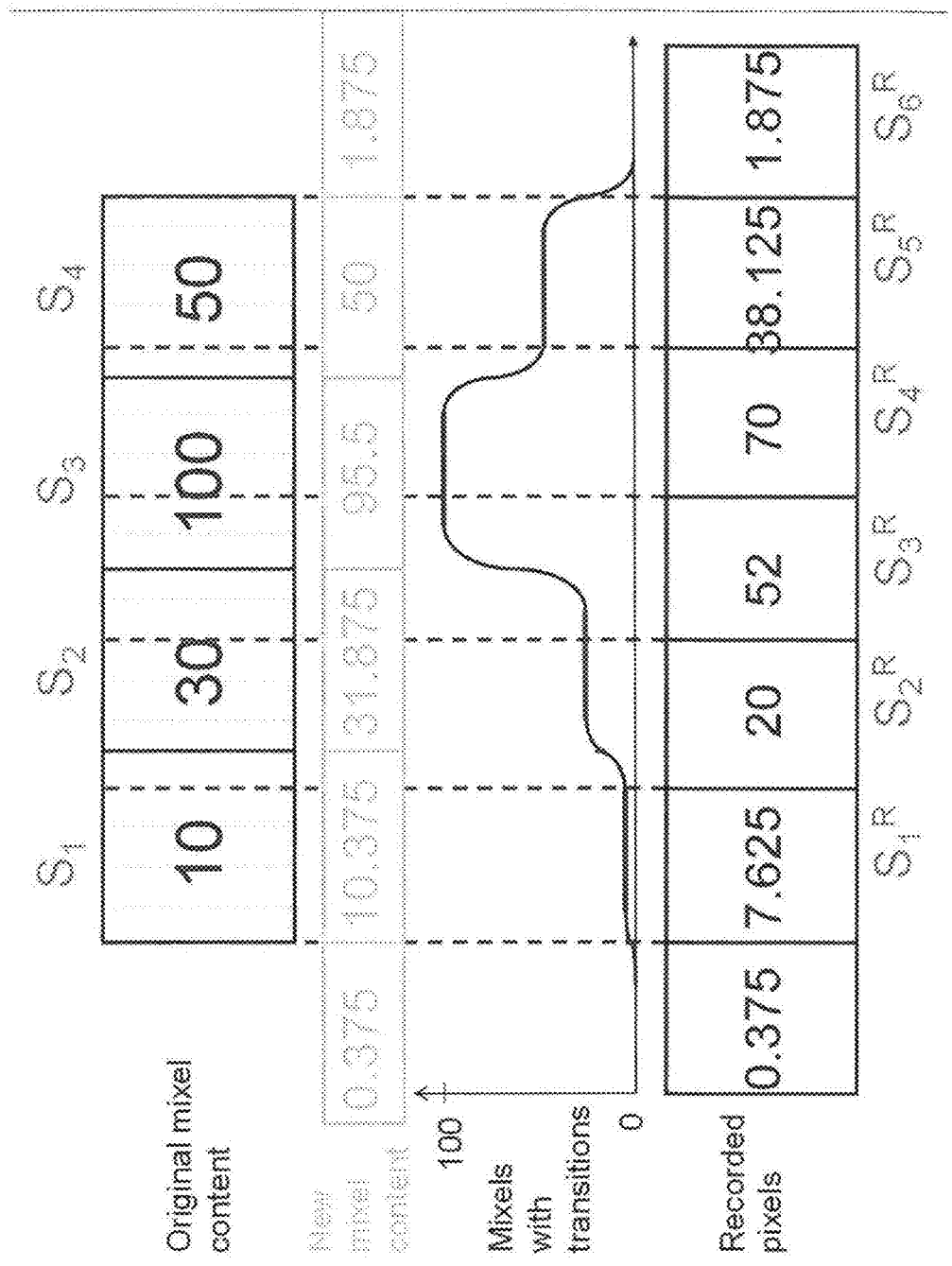
FIG. 13 shows how the mixel content can be restored after the mixel borders have been blurred in the relay optics, and the amount of blurring is known.

FIG. 13 shows how the mixel content can be restored after the mixel borders have been blurred in the relay optics, and the amount of blurring is known.

Figure 14:
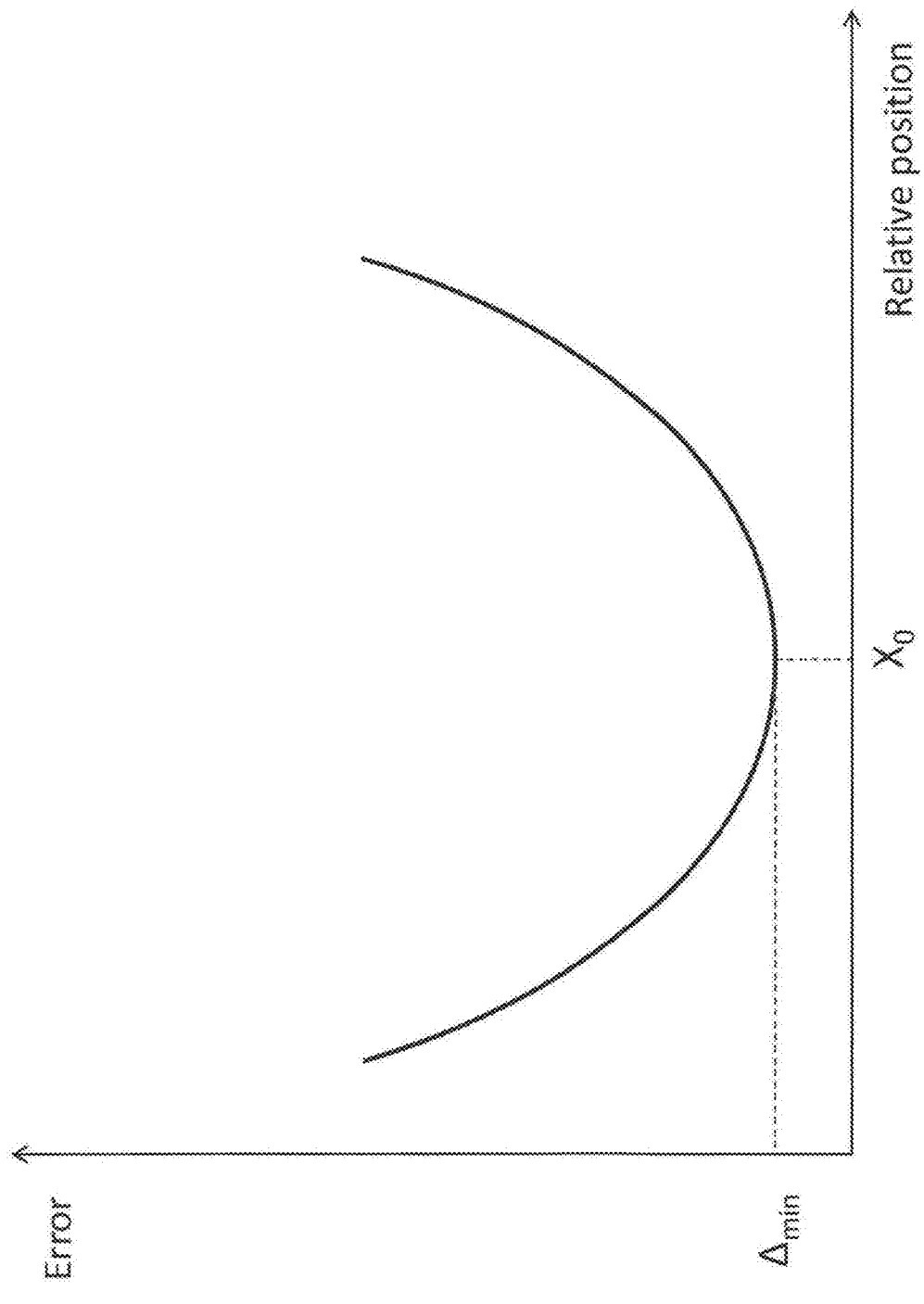
FIG. 14 shows how the deviation between the calculated sensor pixel values (from the approximate solution for the mixel values) and the recorded sensor pixel values changes as a function of the assumed position of mixels relative to the sensor pixels.

FIG. 14 shows how the deviation between the calculated sensor pixel values (from the approximate solution for the mixel values) and the recorded sensor pixel values changes as a function of the assumed position of mixels relative to the sensor pixels.

When the assumed relative position between the mixels and the pixels is correct, the inequality is minimum. This can be used for measuring the relative position of mixels and pixels by analysing the captured data. The method can be extended for measuring more than one parameter simultaneously: for example both the relative position of mixels and pixels, and the relative length of the mixel array and the pixel array. In addition the PSF and/or keystone can be measured.

FIG. 15A shows a two-dimensional mixel array (3500) on top of a two-dimensional pixel array or sensor (2100). FIG. 15B shows the same layout but this time the mixel array is distorted (3500) to fit the smile and keystone generated by the camera optics. The restored mixel intensities will represent smile-free and keystone-free hyperspectral data.

Figure 16:
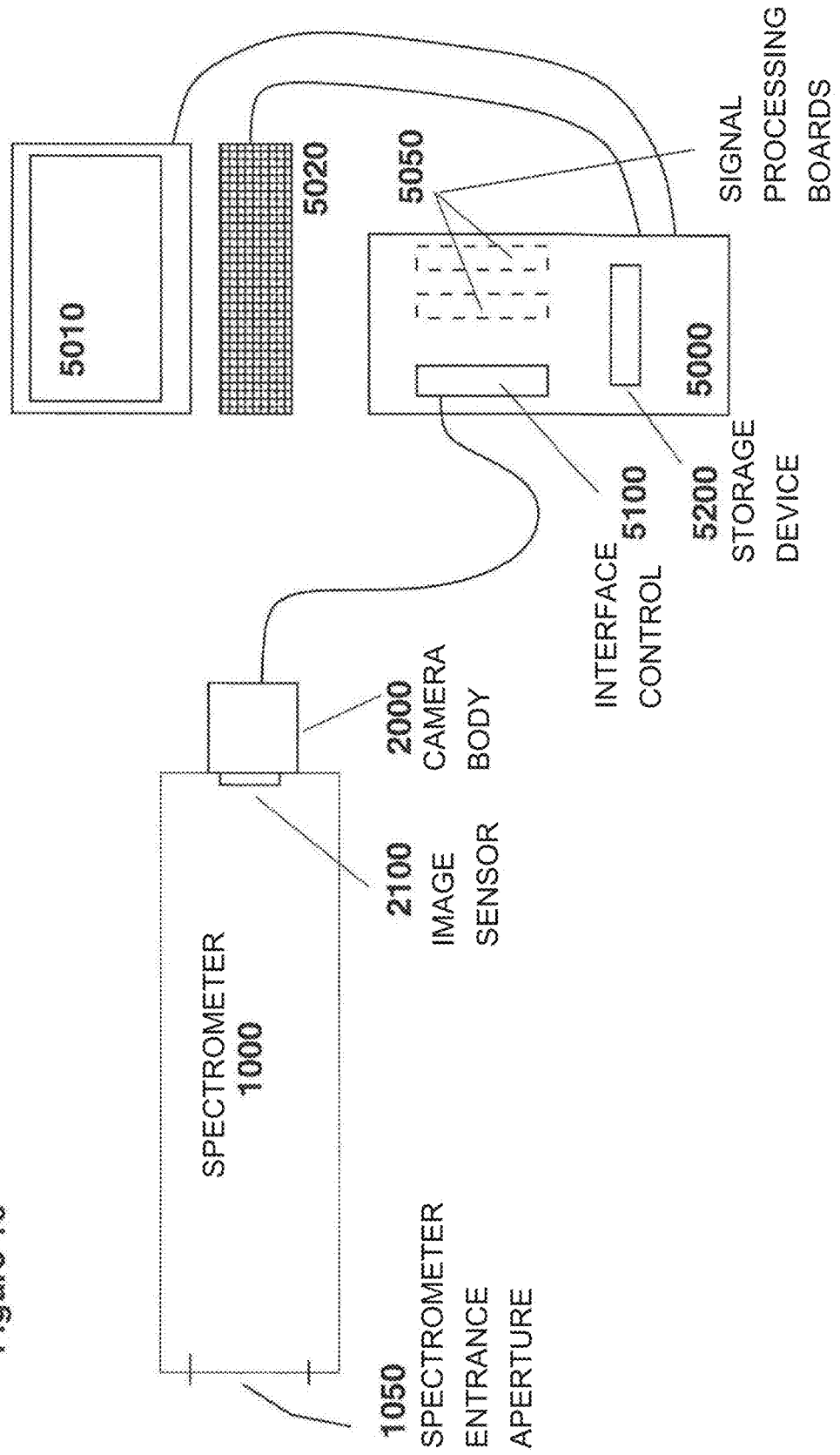
FIG. 16 shows a system set-up based on a computer (5000) with an interface controller (5100) for communicating with and controlling the camera body (2000) with sensor (2100).

FIG. 16 shows a system set-up based on a computer (5000) with an interface controller (5100) for communicating with and controlling the camera body (2000) with sensor (2100). The camera body (2000) is connected to the spectrometer part (1000) with entrance aperture (1050). The computer (5000) will control the camera body and the spectrometer, and will also receive data acquired from the sensor (2100) and process them to restore corrected data in the standard CPU system of the computer or utilising one or more optional signal or graphics processing board(s) (5050). Temporary and processed data may be stored on a permanent storage device (5200) like a hard disk.

Figure 17:
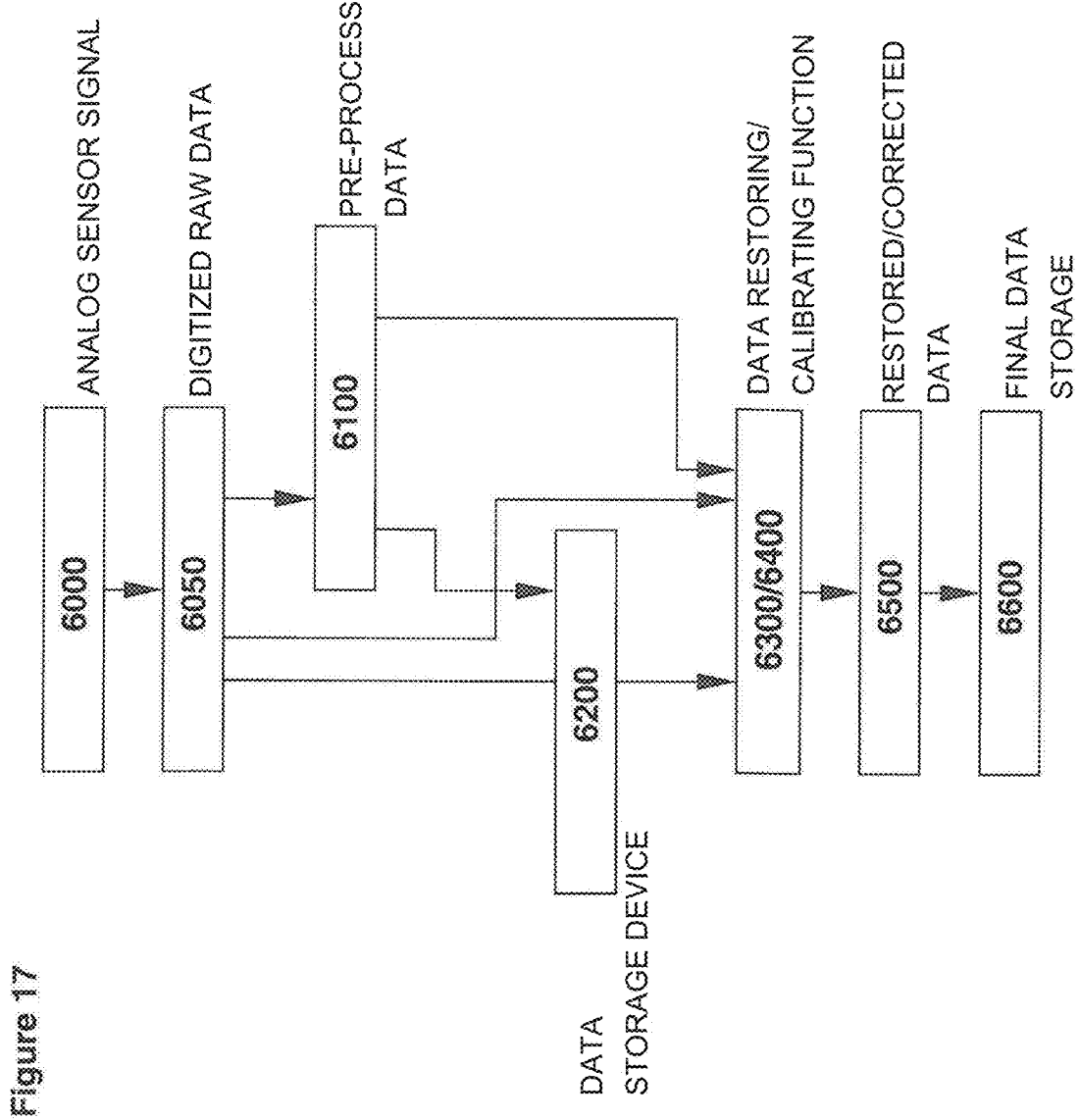
FIG. 17 shows a simplified sketch of the data flow and the process steps in the signal processing related to the restoring of data.

FIG. 17 shows a simplified sketch of the data flow and the process steps in the signal processing related to the restoring of data. An analogue sensor signal (6000) is digitised giving digitised raw data (6050) which may undergo an optional pre-processing (6100). At this level the raw data might be temporarily stored in a raw data storage (6200) for later processing or immediately go further in the chain to data restoring (6300) and/or calibration (6400). The output of this is restored or corrected data (6500) which might be displayed right away or be stored in the final data storage means (6600).

Figure 18:
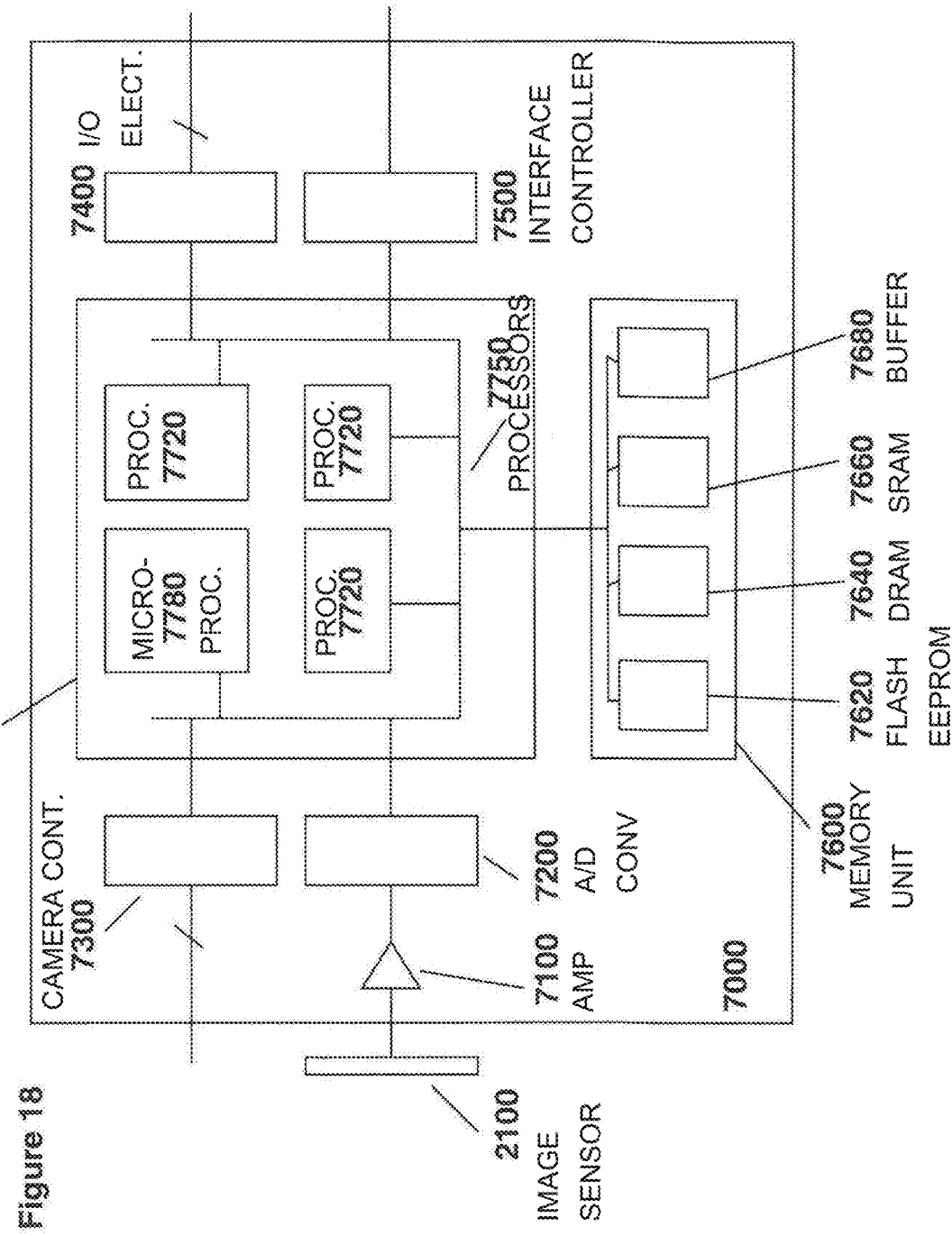
FIG. 18 shows one possible implementation of the electronic system (7000) of a self-contained hyperspectral camera.

FIG. 18 shows one possible implementation of the electronic system (7000) of a self-contained hyperspectral camera according to the present disclosure. The figure shows the image sensor (2100) feeding analogue signals into an amplifier system (7100) which output is input to an analog to digital converter (7200). The figure also shows electronics for camera control (7300) which will control a positioning stage and possibly the image sensor. Electronics for I/O control (7400) like external sync signals is also shown. An interface controller (7500) is shown and this might be controlling interface types like CameraLink, FireWire, USB, Ethernet, GigE etc. A memory unit (7600) is shown and this might be comprising one or more of Flash/EEPROM (7620), DRAM (7640), SRAM (7660), buffer or FIFO circuits (7680) or any other types of memory devices. All this is interconnected to the processor module (7700) comprising at least one processor (7780) which might be a general microprocessor, a microcontroller or a digital signal processor or an embedded processor in a field programmable gate array. The processor module (7700) might also be comprising one or more additional processor units (7720). These additional processor units (7720) might be custom modules optimised for tasks or sub-tasks related to equation solving and optimisation of overdetermined equation sets.

FIGS. 19A through 19C show some examples of a partially clogged light mixing element. FIG. 19A shows a mixel (3000) partially clogged with matter (3030). The clogging matter is only present in the projection onto the rightmost pixel on the image sensor (2100). FIG. 19B shows another scenario where the clogging matter has started to cross the border between pixels, and FIG. 19C shows a case where the clogging matter is present in the projection onto both pixels.

The current disclosure introduces new "light mixing" elements, a kind of imaginary pixels, combined with a novel approach to restore image information corresponding to these imaginary pixels based on image data from a traditional image sensor. Compared to existing hyperspectral cameras a hyperspectral camera according to the current disclosure has several advantages, namely it:

1) Significantly reduces spatial misregistration relative to the pixel size compared to the existing hardware corrected solutions.

2) Removes the necessity to correct spatial misregistration in the imaging optics. This opens up a possibility to use other optical designs than the traditional "hyperspectral solutions" such as Dyson or Offner relays. Therefore the spatial resolution (and the pixel count) as well as light throughput of the imaging optics can be greatly increased. The manufacturing and centration tolerances at the same time will not have to be tighter than in the current systems. On the contrary, they may be more relaxed.

3) Keeps resolution and pixel count of the recorded data nearly at the same level as the sensor pixel count.

FIG. 1 shows the basic principle of the current disclosure. Foreoptics (2020) project the scene onto the slit plane (2040).

Figure 3:
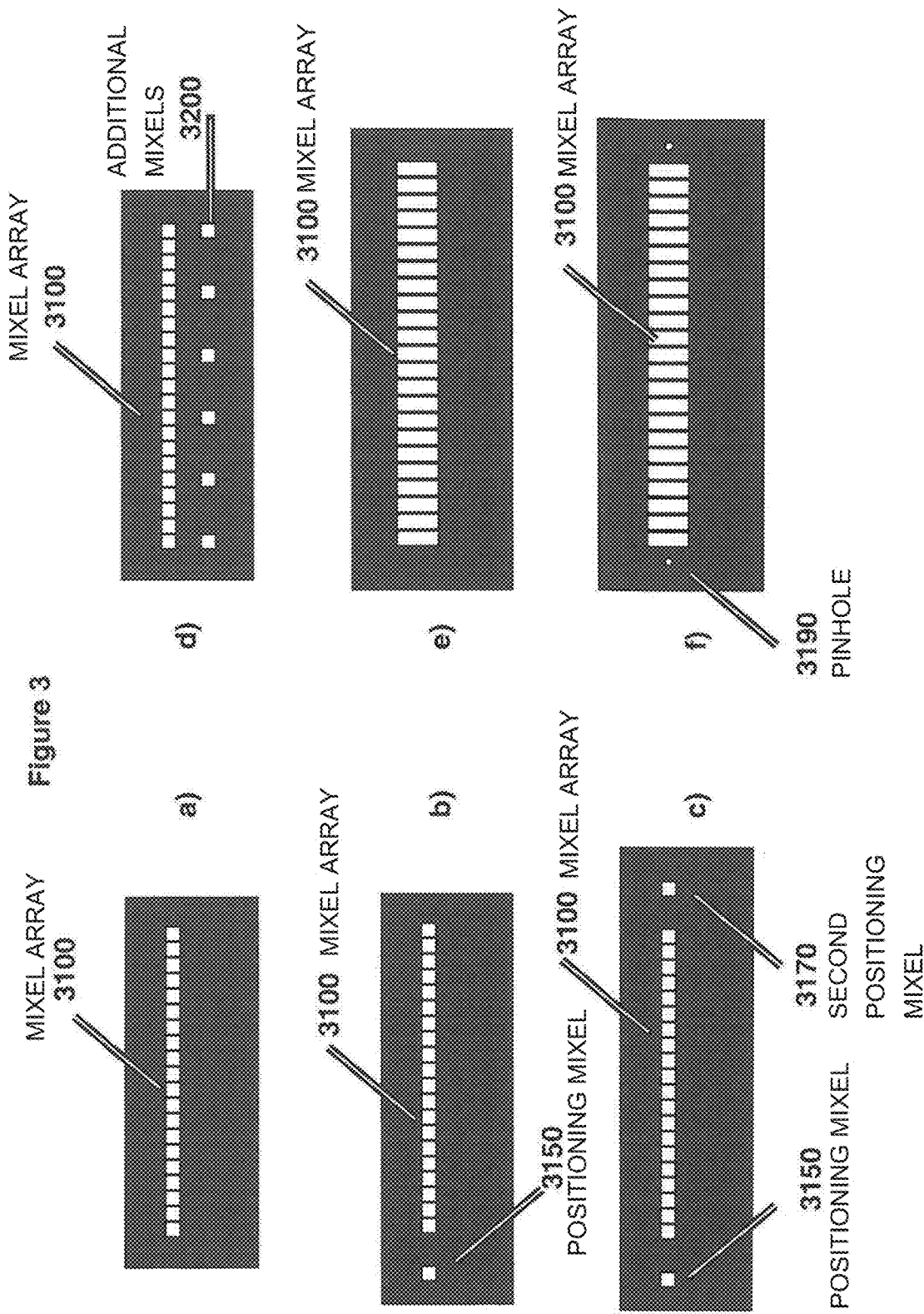
FIGS. 3A through 3F show a slit (3100) with mixing chambers and the additional holes/chambers for calibration purposes.

The slit plane (2040) contains an optical component (3100) which mixes the light in such a way that the spatial content of the signal has slightly lower resolution than the spatial resolution of the sensor. An example of such component is an array of square chambers (3000) with reflective walls as shown in FIGS. 1 and 3 at (a). The number of chambers has to be at least a few percent lower than the pixel count of the sensor (2100) in the spatial direction. Each chamber (3000) contains radiance and spectral content of a small scene area which will be recorded as one pixel in the final captured data. The projection of this scene pixel onto the slit will hereafter be referred to as a "mixel."

A mixel or an array of mixels have feature sizes in the micron and tens of microns range for the most common wavelengths and pixel sizes, therefore the machining tolerances are stringent. One possible method to manufacture the mixels or array of mixels is to use a high-aspect-ratio micromachining technique using deep X-ray lithography. One feasible option is often called the "LIGA" process. A publication describing such processes is "*High-Aspect-Ratio Micromachining Via Deep X-Ray Lithography*", H Guckel, Proceedings of the IEEE, Vol. 96, No. 8, August 1998.

For systems with more relaxed tolerance requirements laser machining or possibly other methods can be used to manufacture the array of mixing chambers.

For some optical designs it might be beneficial to have varying mixel lengths (ref. FIG. 7H and/or a curved mixel array (ref. FIG. 7B, 7C, 7F, 7G.

The slit with the mixel array can be protected from contaminants, such as dust particles and gas, by transparent windows or lenses.

These windows can be placed far enough from the slit, so that any scratches, particles, and other imperfections on the surfaces of these windows would appear very blurry in the slit plane, sensor plane, or any other corresponding intermediate plane.

The slit enclosure formed by the windows and/or lenses can be filled with gas such as nitrogen in order to prevent oxidation of the reflective surfaces of the mixel array i.e., introducing a protective atmosphere. This enclosure can be sealed or it can be purged with the gas in question. Another alternative is to have vacuum in the enclosure.

The relay optics (2060) projects the image of the slit (3100) onto the sensor (2100). The image of each mixel has to be (at least a few percent) larger than one sensor pixel. Also, in order to reduce noise in the final data it is beneficial to make the projection of the mixel array at least 1 pixel shorter than the length of the sensor, so that for every mixel (including the mixels at the ends of the mixel array) most of the energy is captured by the sensor. The dispersive element (2080) in the relay optics (2060) ensures that the image of the slit is dispersed approximately perpendicular to the slit (3100).

The processing unit restores the intensity content of each mixel (for each spectral channel) based on the sensor output.

Restoring Equations

After the light is captured by the sensor, it is possible to calculate with high accuracy the total amount of light inside each mixel for each wavelength. The result of these calculations will accurately represent the spatial and spectral content of the captured scene.

The method to perform these calculations is described below. First, the general equations are presented. Then, a simple example which illustrates the principle for the case of infinitely sharp optics is provided (the Chapter "Flat light distribution"). Finally, it is shown how to take into account the blur introduced by the optics (the Chapter "Flat light distribution with transitions"). Again, a simple numerical example is provided.

The General Equations

First consider the situation where it is desired to restore N mixels from M recorded pixels (M>N). The keystone is then equal to (M-N) pixels. This situation is shown in FIG. 8. FIG. 8 shows the mixels and the corresponding recorded pixels for the general case.

One can now set up the following set of equations:

$$S_m^R = \sum_{n=1}^{N} q_{mn} S_n, \quad (Eq. 1)$$

$$m = 1, 2, \ldots, m, \ldots, M-1, M$$

where: $S_n$ is signal content of mixel #, $S_m^R$ is signal content recorded in pixel #m on the sensor, $q_{mn}$ is the fraction of the signal content in mixel #n that is recorded in pixel #m on the sensor, N is the total number of mixels, M is the total number of pixels recorded on the sensor.

Here $S_m^R$ is known (measured) and $q_{mn}$ is known (can be calculated) for all m and n when the keystone for the system and the "shape" of the light distribution from the mixel (as it is projected onto the sensor) is known.

Equation 1 can be written in matrix form:

$$\begin{pmatrix} q_{11} & \cdots & q_{1n} & \cdots & q_{1N} \\ \vdots & & \vdots & & \vdots \\ q_{m1} & \cdots & q_{mn} & \cdots & q_{mN} \\ \vdots & & \vdots & & \vdots \\ \vdots & & \vdots & & \vdots \\ q_{M1} & \cdots & q_{Mn} & \cdots & q_{MN} \end{pmatrix} \cdot \begin{pmatrix} S_1 \\ \vdots \\ S_n \\ \vdots \\ S_N \end{pmatrix} = \begin{pmatrix} S_1^R \\ \vdots \\ S_n^R \\ \vdots \\ S_M^R \end{pmatrix} \quad (Eq. 2)$$

Since typically only a couple of mixels contribute to each recorded pixel, most of the coefficients q are equal to zero. The matrix will then typically have the form:

$$\begin{pmatrix} q_{11} & & & & & \\ q_{21} & q_{22} & & & & \\ & \ddots & \ddots & & & \\ & & q_{m(n-1)} & q_{mn} & & \\ & & & \ddots & \ddots & \\ & & & & q_{(M-1)(N-1)} & q_{(M-1)N} \\ & & & & & q_{MN} \end{pmatrix} \cdot \begin{pmatrix} S_1 \\ \vdots \\ S_n \\ \vdots \\ S_N \end{pmatrix} = \begin{pmatrix} S_1^R \\ \vdots \\ S_m^R \\ \vdots \\ S_M^R \end{pmatrix} \quad (Eq. 3)$$

where the coefficients $q_{mn}$ are nonzero only along the diagonals and zero everywhere else. The matrix q describes important properties of the camera and can be called the "camera model".

The matrix system (Eq. 2 and 3) can now be solved for the unknowns $S_n$. Note that the system has more equations than unknowns (M>N). In fact, each extra pixel of keystone gives one extra equation. However, for the ideal case when there is no noise in the system, the matrix system is compatible, i.e., can be solved. For a real system with noise, the system is overdetermined and an optimisation method such as for instance the least squares method must be used to obtain the solution.

The process described above can be repeated for all spectral lines. This means that even though the spectral lines have different length (i.e. different keystone) they will all be converted to the same final grid with no loss of resolution with regards to mixel count. Of course the number of mixels should be lower than the number of sensor pixels for the method to work.

Flat Light Distribution

Let us look at the case when the light distribution from each mixel is flat. An example with four such mixels recorded onto five sensor pixels is shown in FIG. 10 and in a somewhat simplified form in FIG. 9. FIG. 10 shows the mixels with flat light distribution recorded onto the sensor pixels.

The corresponding matrix equations are given by:

$$\begin{pmatrix} 0.8 & 0 & 0 & 0 \\ 0.2 & 0.6 & 0 & 0 \\ 0 & 0.4 & 0.4 & 0 \\ 0 & 0 & 0.6 & 0.2 \\ 0 & 0 & 0 & 0.8 \end{pmatrix} \cdot \begin{pmatrix} S_1 \\ S_2 \\ S_3 \\ S_4 \end{pmatrix} = \begin{pmatrix} 8 \\ 20 \\ 52 \\ 70 \\ 40 \end{pmatrix} \quad (Eq. 4)$$

and give the correct mixel values [10 30 100 50] when being solved. This example is noise free and the system is therefore compatible, but in real life the system will be overdetermined.

Flat Light Distribution with Transitions

Before the mixels with flat light distribution is recorded onto the sensor, the signal passes through optics which 'smears' the signal somewhat. What happens when the signal from a mixel is smeared, is that part of the signal leaks into the neighboring mixels, see FIG. 11. If it is known how the signal is smeared (i.e., the 'shape' of the transition is known), then the original content ($S_n$) of the mixel can be restored as before.

FIG. 11 shows the mixel with flat light distribution and signal content $S_n$ (upper figure), and the corresponding mixel where the signal is smeared and has leaked into the neighboring mixels (lower figure).

FIG. 12 shows an example of a third order polynomial transition used to model the smear effect. FIG. 12 shows an example of the details of such a transition. The transition starts at $x=x_1$ and ends at $x=x_2$. The original signal content (before smearing) of mixel #1 is equal to $y_1$, and the original signal content of mixel #2 is equal to $y_2$ (the width of the mixel is set equal to 1). As an example, it will be shown how the restoring is performed for transitions that can be described by third order polynomials (however, the principle applies to any type of transition as long as the shape of the transition is known).

The equation that describes a third order polynomial transition is $$y = a(x-x_0)^3 + c(x-x_0) + y_0 \quad \text{(Eq. 5)}$$

where a and c are two constants that can be determined from the boundary conditions $y(x_1)=y_1$ (or equivalently $y(x_2)=y_2$) and $y'(x_1)=0$ (or equivalently $y'(x_2)=0$), which gives the expressions:

$$a = -\frac{2(y_2 - y_1)}{(x_2 - x_1)^3} \quad \text{(Eq. 6)}$$

$$c = \frac{3(y_2 - y_1)}{2(x_2 - x_1)}$$

The transition has odd symmetry about its centre $(x_0, y_0)$, where $x_0$ and $y_0$ are given by $$x_0 = \frac{x_1 + x_2}{2} \quad \text{(Eq. 7)}$$

$$y_0 = \frac{y_1 + y_2}{2}$$

In order to find the signal content $\Delta s^m$ of the area that lies between $x=x_a$ and $x=x_b$ of mixel #n and that is recorded onto pixel #m on the sensor, one must calculate:

$$\Delta s^m = \int_{x_a}^{x_b} y \cdot dx \quad \text{where} \quad \text{(Eq. 8)}$$

$$y = \begin{cases} a_n(x - x_{0n})^3 + c_n(x - x_{0n}) + y_{0n}, & \text{when } x_{0n} \leq x < x_{2n} \\ y_n, & \text{when } x_{2n} \leq x \leq x_{1(n-1)} \\ a_{n+1}(x - x_{0(n+1)})^3 + c_{n+1}(x - x_{0(n+1)}) + y_{0(n+1)}, & \text{when } x_{1(n+1)} < x \leq x_{0(n+1)} \end{cases} \quad \text{(Eq. 9)}$$

Here $a_n$ and $c_n$ are the coefficients in the equation that describes the transition between mixel #(n−1) and mixel #n.

FIG. 13 shows an example where four such mixels are recorded onto five (+two) sensor pixels. The mixels with transitions are recorded onto the sensor pixels. The transition extends a fraction 0.2 into each side of the mixel.

The corresponding matrix equations are given by:

$$\begin{pmatrix} 0.0375 & 0 & 0 & 0 \\ 0.7625 & 0 & 0 & 0 \\ 0.2 & 0.6 & 0 & 0 \\ 0 & 0.4 & 0.4 & 0 \\ 0 & 0 & 0.6 & 0.2 \\ 0 & 0 & 0 & 0.7625 \\ 0. & 0 & 0 & 0.0375 \end{pmatrix} \cdot \begin{pmatrix} S_1 \\ S_2 \\ S_3 \\ S_4 \end{pmatrix} = \begin{pmatrix} 0.375 \\ 7.625 \\ 20 \\ 52 \\ 70 \\ 38.125 \\ 1.875 \end{pmatrix} \quad \text{(Eq. 10)}$$

and give the correct values (original mixel content) [10 30 100 50] when solved for the unknown mixel values. This example is noise free and the system is therefore compatible, but in real life the system will be overdetermined.

Keystone and PSF Variations in the Foreoptics

It is important to remember that the data is restored (i.e., the keystone and PSF are corrected) only for the relay optics. The foreoptics still needs to be as keystone free as possible with as similar PSF for different wavelengths as possible. The keystone part can be solved by using reflective optics which is (of course) completely keystone free.

Now about the PSF variations. By using relay optics with magnification 0.2 . . . 0.5× (or −0.2 . . . −0.5×) it is possible to achieve F-numbers as low as F1-F1.3 in the image space and at the same time have very modest F-number in the slit plane (~F4-F6).

Therefore:

(i) The foreoptics can be designed and made diffraction limited.

(ii) The size of the Airy disk becomes quite small compared to the pixel size (and therefore the disk is small compared to the mixel size too). It means that even though there is a difference in PSF size for the shorter and the longer wavelengths, this difference is quite small compared to the mixel size and therefore it will not affect the final data as much as it happens in conventional systems.

One optimization that can be performed for the array of mixing chambers is to put refractive optics in front of the array of mixing chambers to equalize the point spread function for different wavelengths. This refractive optics will defocus different wavelengths differently to compensate for different point spread function as function of the wavelengths in the fore optics.

For a given f-number of the foreoptics in an embodiment without refractive optics there is an optimal ratio between the width of the mixing chamber and its length. For this ratio the best mixing will be achieved. This ratio should be adjusted in the embodiment using refractive optics in front of the mixing chambers. The optimal ratio for the different optical solutions can be achieved using advanced optical simulation software or can be found analytically. Yi-Kai Cheng and Jyh-Long Chern has in the academic paper "*Irradiance formations in hollow straight light pipes with square and circular shapes*" (Vol. 23, No. 2/February 2006/

J. Opt. Soc. Am A) investigated light propagation in hollow straight light pipes in more detail.

The refractive optics in front of the array of mixing chambers may be implemented as a lens system or as one or more flats made of an optically transparent material where one takes advantage of the longitudinal chromatic aberration of the material. These flat(s) could be made of, but not limited to, any standard optical material.

Calibration

The relative position of mixels and pixels in the across-the-track direction must be known precisely in order to restore the mixel values correctly.

A single mixel at one end of the array (FIG. 3B), which is separated from the rest of the array by a relatively large gap, would illuminate 2-3 pixels of the sensor for each spectral channel. If the PSF of the optics is known, the position of the sensor relative to the mixel array can be calculated. This single mixel may have any shape, it may also be a pinhole, or a dedicated light source. The main requirement is to have known intensity distribution inside it.

Placing two such mixels (one on each side of the mixel array, FIG. 3C (c)) will provide the possibility to monitor the position and the length of the sensor relative to the mixel array.

Instead of using a part of the main sensor for measuring the position of the reference mixels or light sources it is possible to use small dedicated sensors besides the main sensor. Also, additional optics such as mirrors and/or prisms can be used to direct the light to these small sensors.

As it has been pointed out, in order to restore the mixel content correctly the PSF of the relay optics (i.e. the shape of transition between every two adjacent mixels) should be known. This can be found directly in the optical design software but it will not be very precise since the PSF is very affected by tolerances in the optical system. The best would be to measure the PSF directly on the assembled system for several wavelengths and field points. For this purpose a secondary array of mixels (or pinholes) should be placed parallel to the primary array (FIG. 3D). Every two adjacent elements of the secondary array should have sufficiently large gap in between—so a single PSF can be clearly observed. The simplest (but again not very precise) method of measuring PSF would be to use the signal from the 3 consecutive sensor pixels where a signal mixel from the secondary array is imaged. Much more precise information about PSF can be obtained by taking several measurements from those sensor pixels and changing the position of the mixel relative to the sensor for each measurement. This can be done by a high resolution translation stage.

When the PSF is known for several wavelengths and field points, it is possible to use the same secondary array for measuring the keystone of the optics. While it is possible to get the information about keystone from the optical design software, measuring keystone of the real assembled system allows to relax the tolerances.

It is also possible to determine the position and the length of the mixel array relative to the sensor, as well as keystone and PSF, by restoring the data from a natural scene and minimising (by varying the assumed position, length, keystone and/or PSF) the inequalities in the solved overdetermined system of linear equations.

To restore the mixel values we must solve equation (2) which can be written in short form:

$$q \cdot S = S^R \quad \text{(Eq. 11)}$$

where q–[M×N] matrix with M>N; S–[N×1] vector; $S^R$–[M×1] vector

The system is overdetermined and may be solved by use of an optimization method, such as the least squares method. The least squares method searches for the solution $\tilde{S}$ that gives the best fit $\tilde{S}^R$ to the recorded data $S^R$, i.e., that minimizes the error vector $\Delta$ where:

$$\Delta = \tilde{S}^R - S^R \quad \text{(Eq. 12)}$$

and $$\tilde{S}^R = q \cdot \tilde{S} \quad \text{(Eq. 13)}$$

The more noise that is present in the sensor pixels, the larger the error vector $\Delta$ will be. This fact can be used to calibrate the system with respect to relative position between mixels and pixels and/or relative length of the slit and/or keystone and/or PSF, based on the information in the captured image only.

Consider an example where one wants to calibrate the system with respect to the relative position between mixels and pixels. An assumed relative position that is different from the correct one is equivalent to noise in the sensor pixels, and will make it more difficult to fit a solution (for the mixels values) to the recorded data (the sensor pixels). This means that the resulting error vector $\Delta$ will be larger, and the more incorrect the assumed relative position is the larger vector $\Delta$ will be. The smallest value for the error vector $\Delta = \Delta_{min}$ is found when the assumed relative position is correct. By varying the assumed relative position and determining when the error is smallest, the correct relative position between mixels and sensor pixels can be determined. FIG. 14 demonstrates the principle. The figure shows the error $\Delta$ as a function of assumed relative position. The minimum error vector $\Delta_{min}$ is found for the correct relative position $X_0$.

The same method can be used to calibrate for the relative length of the slit and/or keystone and/or PSF.

Two-Dimensional Mixel Array, Correction of Smile

The mixel array can be made two-dimensional and placed close to the sensor plane or in any intermediate image plane after the dispersive element. The most practical location for it is the sensor plane. This gives a possibility to correct not only keystone but also smile.

The array is distorted according to the smile and keystone of the optical system. Since the size of each mixel is slightly larger than the size of the sensor pixels, the light from each mixel will be distributed between 4 or more sensor pixels. Since the number of pixels is larger than the number of mixels, and the light distribution inside each mixel is known, it is possible to restore the intensity content of each mixel based on the sensor output similarly to what is done in the one-dimensional case. The principle is shown in FIGS. 15A and 15B. The restored intensity content of the mixels forms a smile and keystone free image as long as the geometry of the two-dimensional mixel array replicates the smile and keystone of the optical system. The misregistration error caused by differences in PSF (for the optics before the two-dimensional mixel array) for different wavelengths will in this case remain uncorrected. Therefore, the optics does not need to be corrected for smile or keystone but must have as similar PSF for different wavelengths as possible.

Data Processing from a System Calibration Perspective.

The PSF of the camera optics is measured for every extra mixel and/or pinhole (3150)(3170)(3190) (ref. FIG. 3A through 3F) for one or more wavelengths. The PSF for the secondary mixel array (3200) is measured for several wavelengths. Measurements of PSF are done by moving the mixel array relative to the sensor (or vice versa) in small steps. This can be done with a commercially available or custom-made translation stage.

If there is not have a monochromatic light source or a light source with distinct spectral lines during the calibration procedure it might be beneficial to use a shutter to close the first array of light mixing elements while the second array is being used for calibration. During normal use it will similarly be beneficial to close the secondary array using another shutter For the camera with the secondary mixel array (3200) when the PSF is known, the secondary mixel array (3200) can be used to characterise the keystone of the camera optics. The main mixel array (3100) (ref. FIG. 3D) may be obscured using a shutter or similar device, and only the light passing through the secondary mixel array should be used. The measured keystone and the PSF data should be used to form the matrix q in the equation 2. The secondary mixel array should now be obscured, and the main mixel array with the end pinholes/mixels (3150)(3170)(3190) should be opened. If the camera does not have the secondary mixel array, the keystone and the PSF data can be imported from the optical design software such as ZEMAX brand software sold by ZEMAX Development Corporation.

The signal from the end pinholes/mixels (3150)(3170)(3190) and the PSF data for the corresponding field points are used to determine the position and/or length of the mixel array relative to the sensor. In principle, this position and this length can be predetermined by the mechanics of the camera, but since it is desirable to know them with subpixel accuracy, the easiest way is normally to monitor the signal from the end pinholes/mixels. Note that if the end pinholes/mixels are present, more or less every captured frame, i.e. every spatial line, will have the data about the current relative position and/or length of the mixel array relative to the sensor.

The information about the position and length of the mixel array relative to the sensor is used to adjust the coefficients of the matrix q in Eq. 2. Alternatively, several versions of the matrix q for different relative positions and lengths can be generated in advance in order to reduce the amount of calculations for finding mixel values.

The mixel values for different wavelengths can now be found by solving the overdetermined Eq. 2 and optimising the solution by minimising the inequalities in the solved system.

Any or all of described calibration steps can be skipped. Instead, the data from a natural scene can be restored for different assumed positions and/or lengths of the mixel array relative to the sensor, and/or PSF's and/or keystone. The solution, where the inequalities in the equation 2 are at the minimum, is the most accurate.

Also, if the image sensor contains a dead or hot pixel, the inequalities in the solved Eq. 2 will increase. If there is a reason to suspect that one of the sensor pixels is dead or hot (for example, by inspecting a few images) it is possible to exclude that particular pixel from the Eq. 2. The corresponding mixel can still be calculated because it is imaged onto at least two adjacent sensor pixels in each spectral band. Then it can be checked whether the inequalities in the solved equation 2 were lowered by excluding the suspected dead or hot pixel from the calculations. If it is not known which of the sensor pixels is hot or dead, it is possible to exclude one of them at a time from the equation 2, and then solve that equation. This action should be repeated for every suspected pixel of the sensor (or even for every pixel of the sensor). The solution of the equation 2 with the lowest inequalities will indicate which pixel is hot/dead and therefore is to be excluded from the calculations.

In case of a perfectly calibrated camera and ideal mixing the inequalities in the solved Eq. 2 will occur only because of photon noise and readout sensor noise, i.e. they will depend on the brightness of the scene only. If the inequalities are larger, than the brightness of the scene would suggest, this would indicate that the calibration of the camera (i.e. the coefficients in the matrix q from the equation 2) is not optimal. In other words, inequalities in the solved equation 2 provide useful diagnostic tool for the described hyperspectral camera.

If the information regarding position of individual mixels relative to the pixels is incorrect, there will be errors in the restored data. Such errors will appear on 2D images as artifacts on sharp borders between objects. One way to control, that the position and length of the mixels and pixels relative to each other are correct, is to control that the objects with known geometry (such as buildings) retain their rectangular shape. Also in such cases it is possible to adjust the coefficients of the restoring matrix using the objects with known geometry in the image as a reference.

The energy in each mixel is calculated correctly only if the light distribution in the output of the mixing chamber is independent of the light distribution in the input of the mixing chamber. In a push-broom hyperspectral camera light in each spectral channel becomes partially coherent. The consequence of this partial coherence are ripples—small (in size) variations in light intensity across the output of the mixing chamber. These ripples will have different amplitudes in different parts of the mixing chamber, also their amplitudes will depend on the position of the light source in the input of the mixing chamber, i.e., the light distribution in the output will not be completely independent of the light distribution in the input anymore. For realistic bandwidth of a single spectral channel it will not be very noticeable, but it is possible to further improve the accuracy of calculating the mixel values (i.e. when solving Eq. 2) if the mixel array is moved a few times during every exposure back and forth perpendicular to the optical axis and parallel to the slit. The optimal amplitude of such movement is larger than the size of ripples but smaller than the mixel width. As is obvious for a person skilled in the art, the PSF which is used for forming the matrix q in Eq. 2 includes both the PSF of the optics and PSF introduced by the motion blur.

In a case when a mixel is clogged, it is possible to measure the amount of clogging and to adjust the restoring coefficients accordingly—so that the image is restored correctly. This may improve yield in slit manufacturing and/or allow use of a partially destroyed slit.

Three different scenarios are described below:
1) The input of a mixel is partially clogged.
2) The output of a mixel is partially clogged.
3) A mixel is fully clogged.

If the input of a mixel is partially clogged, it still mixes light, i.e. it outputs even illumination but the intensity is lower than it is supposed to be according to the scene. This will appear on the image as consistently darker pixels. Knowing the attenuation coefficient (i.e. amount of clogging) one can fully recover the original brightness in post-processing, and the only penalty will be increase in noise. The amount of clogging can be measured by observing a uniform object (such as sky, an integrating sphere, an illuminated diffuse object placed between the foreoptics and the mixels), or using statistic of the natural scene when adjacent sensor pixels are assumed to capture similar amount of energy over several exposures. If a mixel, when compared to adjacent mixels, is consistently darker equally in all spectral bands, then the input of this mixel may be considered partially clogged.

If the output of a mixel is partially clogged, it still mixes light, i.e. it outputs even illumination in its unobscured part, and outputs no illumination in the obscured part. FIG. 19A (a) shows a mixel 3000 partially clogged on its output by a particle 3030. The mixel is imaged onto two sensor pixels 2100. The shape of the clogged part can be measured similarly to PSF: by looking at a uniform object (such as an integrating sphere or an illuminated diffuse object placed between the foreoptics and the mixel array) and moving the mixels in small steps parallel to the direction of the mixel array (FIGS. 19A, 19B and 19C. This scanning motion may not be necessary in case of large keystone. If there is large enough keystone in the system (as large as the clogged part of the mixel or larger) and the uniform object is illuminated by a broadband source, then the shape of the clogged part can be found by comparing the illumination of the pixels where the part is imaged to the adjacent pixels in different spectral bands. In case of large enough keystone this will be equivalent to moving the slit in small steps.

If a mixel is clogged completely, the corresponding part of the scene cannot be captured, and will be recorded into the data cube as black. Alternatively, the fully clogged mixel can be interpolation generated by using the data from adjacent mixels.

The benefits of very low misregistration errors can also be utilized in systems where two or more sensors share common foreoptics and slit. If an ordinary slit is used, it is more or less impossible to obtain precise (i.e. small fraction of a pixel) coregistration between different sensors, but when using mixels, it is fairly straightforward: the calibration of the camera is handled independently for each sensor, but since each sensor captures the content of the same mixel array, then the calculated mixel values should have as good coregistration for two or more sensors as they have for a single sensor.

Also, with sufficiently good coregistration between two or more sensors it is possible to expand the use of such cameras to new applications such as high dynamic range hyperspectral imaging, when one of two sensor captures the highlight information about the scene, and the second one captures the shadows of the same scene. And it is all done with nearly perfect spatial coregistration between highlights and shadows.

BRIEF SUMMARY OF DIFFERENT EMBODIMENTS

Two example embodiments according to the current disclosure have been described in the above text. These two embodiments differ in the implementation of the actual array of light mixing elements, mixels, but use the same concepts and principles to process data i.e., "restore" data.

A first embodiment may have a linear array of mixels (3100) placed in the slit plane (2040) or in any of the other intermediate image planes. This embodiment might be a standard one, ref. FIG. 3A and FIG. 7A or it might be comprising other features as shown in FIG. 3B, 3C, 3D or 3F. It could also have shapes as described in FIG. 7B, 7C, 7E, 7F, 7G or 7H. A combination thereof i.e., features and/or shapes will be apparent for the person skilled in the art.

A second embodiment may comprise a two dimensional array of light mixing element (3500). This two dimensional array will be placed directly in front of the image sensor (2100) or in any other intermediate image plane after the dispersive element. A variation of this second embodiment is to make the two dimensional array fit the optical errors of the system i.e., so that it matches the smile and keystone of the optics. The processed or restored image data from this embodiment will be smile and keystone free.

The current disclosure is based on a novel principle of using light mixing elements constituting a kind of imaginary pixels which can be calculated based on data from image sensor pixels. The two embodiments described here cover all optical components all the way to the image sensor.

At the output of the image sensor the electronics, including the data processing system starts. In the present description this will be referred to as the "data processing system". The tasks of the data processing system is to acquire and digitize data from the image sensor and do all necessary processing of and calculation on the data so that restored image data corresponding to the mixels or imaginary pixels be outputted and stored. It will also do all necessary "housekeeping" such as controlling image sensor, translation stages etc.

The two outer ends of different embodiments for the data processing system are described in FIGS. 16 and 18. The standard-component-based system (FIG. 16) may be built using a standard camera head (2000) or industrial camera combined with a PC (5000) and an interface controller (5100) used for communication with the camera. The processing will be done in the PC processor(s) or in additional processor boards (5050) which might be comprising special processors suitable for the processing tasks. These processors (5050) could be GPUs, DPSs and its like. Custom software will be running on the PC controlling the system and acquiring and processing the data.

A version of the camera data processing system in a self-contained embodiment is shown in FIG. 18. In this case the output is processed or corrected, and all this processing will be done by the electronics inside the camera so that it functions more or less like an industrial camera, however, with optics for hyperspectral use included. FIG. 18 and its figure text give a more detailed description of this solution.

As will be apparent for a person skilled in the art, the implementation of the data processing system can be made using the two versions described in this current disclosure or any other solutions in between a custom self-contained system and a standard-component system or any other variations thereof.

The different processing steps may be grouped into logical blocks so that the functionality can be described even though it might be performed on different hardware implementations. The term "image processing unit" refers to a combination of software, firmware and hardware performing the required image processing tasks. The image processing unit is comprising an "equation solver unit" which is the functionality described in the section "Restoring equations" and an "optimisation unit" which is the functionality described in "The general equations". As can easily be understood is that the equation solver unit is solving the equation sets as given in the description and the optimisation unit is optimising the solution. The matrix q in Eq. 2 describes important properties of the camera and can be called the "camera model".

The table below lists the numbers used in the figures:

| Number | Description |
|---|---|
| 1000 | Spectrometer, complete optical part |
| 1050 | Entrance aperture of spectrometer |
| 2000 | Camera body, comprising image sensor, control electronics, data acquisition system etc. |
| 2020 | Foreoptics |

| Number | Description |
| --- | --- |
| 2040 | Slit plane |
| 2060 | Relay optics |
| 2080 | Dispersive element |
| 2100 | Image sensor |
| 2200 | Slit of prior art type |
| 3000 | Mixing element, mixel |
| 3100 | Array of mixel elements, mixels, slit |
| 3150 | One additional mixel for position measurement |
| 3170 | A second additional mixel for position and length measurement |
| 3190 | Circular or pinhole shaped additional pixels |
| 3200 | Additional array of mixels for calibration purposes |
| 3500 | Two-dimensional mixel array |
| 3550 | Two-dimensional mixel array with distortion to correct for optical errors |
| 5000 | Computer |
| 5050 | Signal or Graphics processing board |
| 5100 | Interface controller in computer like CameraLink, Ethernet, USB, FireWire or similar |
| 5200 | Permanent storage device, hard disk, solid state disk and its like |
| 6000 | Analogue sensor signal |
| 6050 | Digitised raw data |
| 6100 | Pre-processing step or pre-processed data |
| 6200 | Storage means for raw data |
| 6300 | Data restoring function |
| 6400 | Calibration function |
| 6500 | Restored/corrected data |
| 6600 | Final data storage means |
| 7000 | Electronic system of self contained camera |
| 7100 | Amplifier system |
| 7200 | A/D converter |
| 7300 | Electronics for camera control |
| 7400 | Electronics for I/O control |
| 7500 | Interface controller for CameraLink, Ethernet, USB, Firewire or similar |
| 7600 | Memory unit |
| 7620 | Flash EEPROM |
| 7640 | DRAM |
| 7660 | SRAM |
| 7680 | Buffer or FIFO |
| 7700 | Processor module |
| 7720 | Custom or special task processor module |
| 7780 | Processor like micro processor, micro controller or DSP |

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A hyperspectral camera, comprising:
a) foreoptics;
b) a slit;
c) relay optics having a dispersive element;
d) an image sensor;
e) an image acquisition device;
f) an image processor;
g) a first array of light mixing elements, each light mixing element in the first array mixing incoming light so that an intensity and spectral content thereof are mixed at an output of the first array, each light mixing element in the first array having a dimension so that projection by the relay optics of the output of each light mixing element onto the image sensor is slightly larger than a pixel on the image sensor, the first array being in a plane of the slit, in a focal plane or in any other plane intermediate to the slit plane and the focal plane;
h) the image processor comprising logic operable to calculate a coefficient matrix with elements $q_{mn}$, the coefficient matrix describing a distribution of mixed light from the light mixing elements onto pixels on the image sensor, the image processor further comprising logic operable as an equation solver for solving an overdetermined equation set, the equation solver configured to solve the equation set, the equation set based on the output from the image sensor and the coefficient matrix, the image processor configured to forward a solution of the equation set to a data output device; and
i) wherein the data output device is configured to generate a corrected data cube.

2. A hyperspectral camera according to claim 1 further comprising a one dimensional array of light mixing elements in the slit plane or any other intermediate plane disposed optically before the dispersive element.

3. A hyperspectral camera according to claim 1 further comprising a two dimensional array of light mixing elements disposed in the image sensor plane or proximately in front of the image sensor or in any other intermediate plane optically after the dispersive element.

4. A hyperspectral camera according to claim 1 further comprising:
means for measuring a position of the first array of light mixing elements relative to the image sensor and/or measuring a length of the first array of light mixing elements.

5. A hyperspectral camera according to claim 4 further comprising:
at least one of an additional light mixing element, a first hole and a light source at one end of the first array of light mixing elements for position measurement
and/or
at least one of two additional light mixing elements, a second hole and a light source, one in each end of a one dimensional array of light mixing elements in the slit plane or any other intermediate plane disposed optically before the dispersive element for length measurement,
the at least one of the additional light mixing elements, the first or second hole and the light source positioned at a selected distance from the first array of light mixing elements.

6. A hyperspectral camera according to claim 5 further comprising:
at least one extra image sensor mounted beside the image sensor and in correspondence with at least one extra array of light mixing elements for the measurement of light mixing array position or light mixing array length respectively.

7. A hyperspectral camera according to claim 1, further comprising:
a second array of light mixing elements having longer spacing than the first array of light mixing elements, the light mixing elements in the second array being used for measurement of a point spread function and/or a keystone of the relay optics.

8. A hyperspectral camera according to claim 1, further comprising:
means for moving the first array of light mixing elements relative to the image sensor.

9. A hyperspectral camera according to claim 1, further comprising:
calibration routines for measurement of at least one of a relative position and a length of the first array of light mixing elements, a keystone or a point spread function and any combination thereof.

10. A hyperspectral camera according to claim 1 wherein the image processor creates an overdetermined equation set with n unknowns based on m measurements, giving m equations, m>n, the image processor configured to calculate an approximate solution to the equation set.

11. A hyperspectral camera according to claim 10 further comprising an optimization function in the image processor for optimizing the solutions of the set of equations for a best fit.

12. A hyperspectral camera according to claim 11 wherein-the optimization function comprises a least squares error function.

13. A hyperspectral camera according to claim 1 further comprising means to move the first array of light mixing elements perpendicular to an optical axis along the slit during an image exposure.

14. A hyperspectral camera according to claim 1 further comprising a protective, optically transparent window or lens optically in front of the first array of light mixing elements, optically on a rear side or on both sides thereof.

15. A hyperspectral camera according to claim 14 further comprising a protective atmosphere comprising vacuum or containing a gas in the enclosure formed around the first array of light mixing elements enclosed by the optically transparent windows or lenses.

16. A hyperspectral camera according to claim 14 wherein the protective windows or lenses are disposed a selected distance away from the first array of light mixing elements so that dust or scratches on the optical surfaces will be out of focus thereby reducing image disturbance.

17. A hyperspectral camera according to claim 1, further comprising a common foreoptics, one common light mixing array, a beam splitter arrangement and at least two image sensors collecting light from a common or partially common relay optics or at least two separate relay optics.

18. A hyperspectral camera according to claim 17 further comprising at least two different image sensors having different spatial resolution and/or sensitivity for different wavelength bands.

19. A hyperspectral camera according to claim 18 further comprising at least two image sensors having substantially equal spatial resolution.

20. A method for acquiring hyperspectral data using a hyperspectral camera comprising foreoptics, a slit, relay optics with a dispersive element, an image sensor, an image acquisition device, and an image processor, the method comprising:

placing a first array of light mixing elements or a second array of light mixing elements in a plane of the slit, in a focal plane or in any plane intermediate thereto, each of the light mixing elements in the first or the second array mixing incoming light so that an intensity and a spectral content are mixed at an output thereof, the array of light mixing elements having a dimension so that the projection by the relay optics of the output of each light mixing element onto the image sensor is slightly larger than an image sensor pixel;

processing data from the image sensor in the image processor using a coefficient matrix with elements $q_{mn}$, the coefficient matrix describing a distribution of mixed light from the light mixing elements onto pixels on the sensor, the processing data further comprising solving an overdetermined equation set, the equation set based on output from the image sensor and the coefficient matrix; and outputting and displaying a data set comprising a corrected data cube.

* * * * *